Feb. 4, 1969     R. L. KOSROW     3,425,369
AUTOMATIC SEWING APPARATUS
Filed July 12, 1966
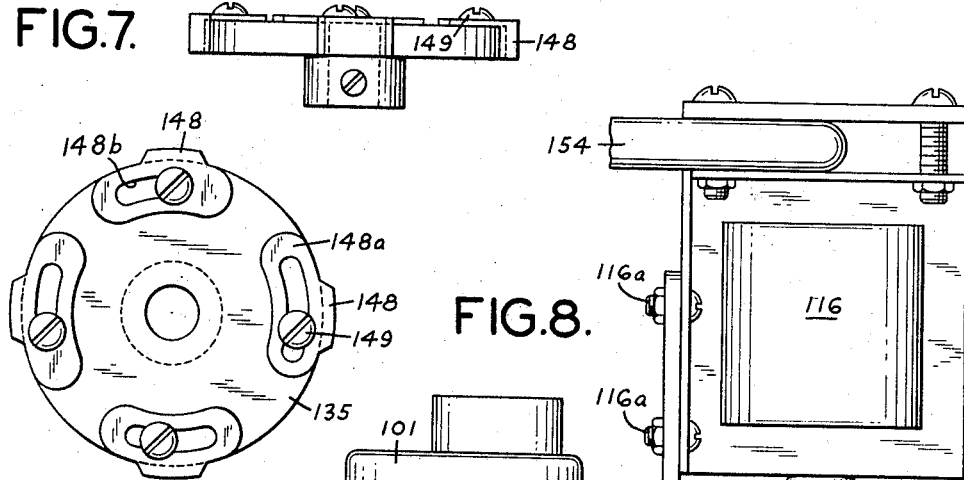
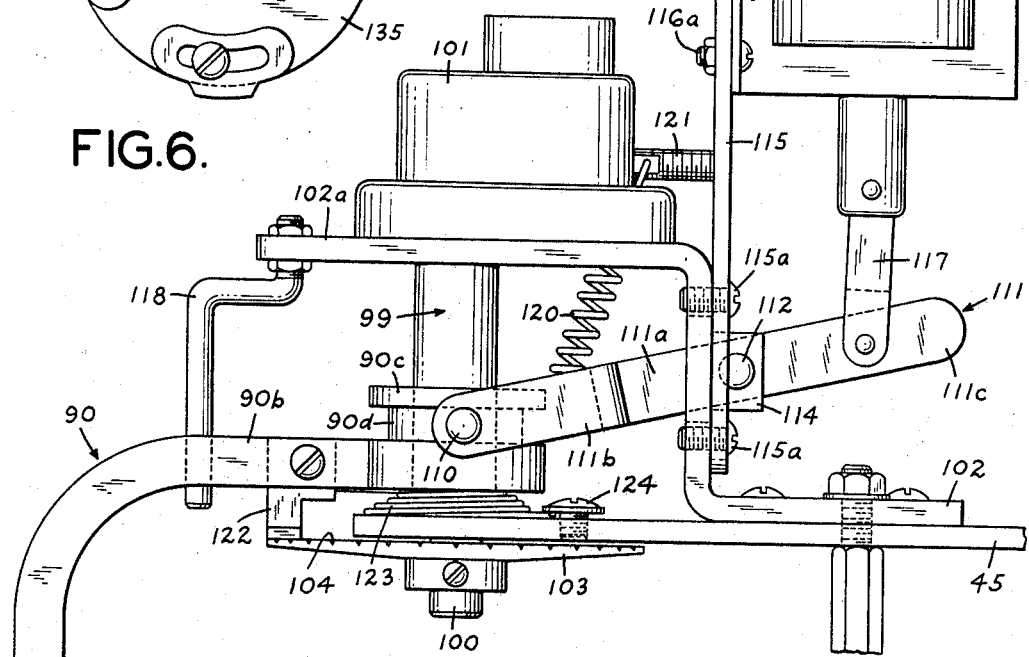
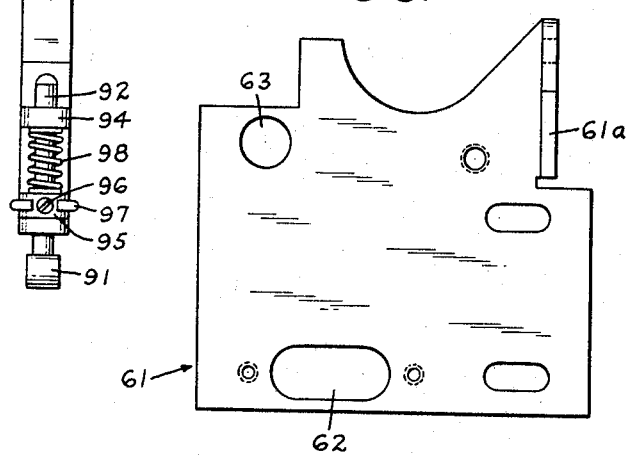
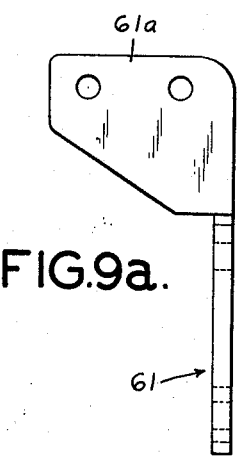

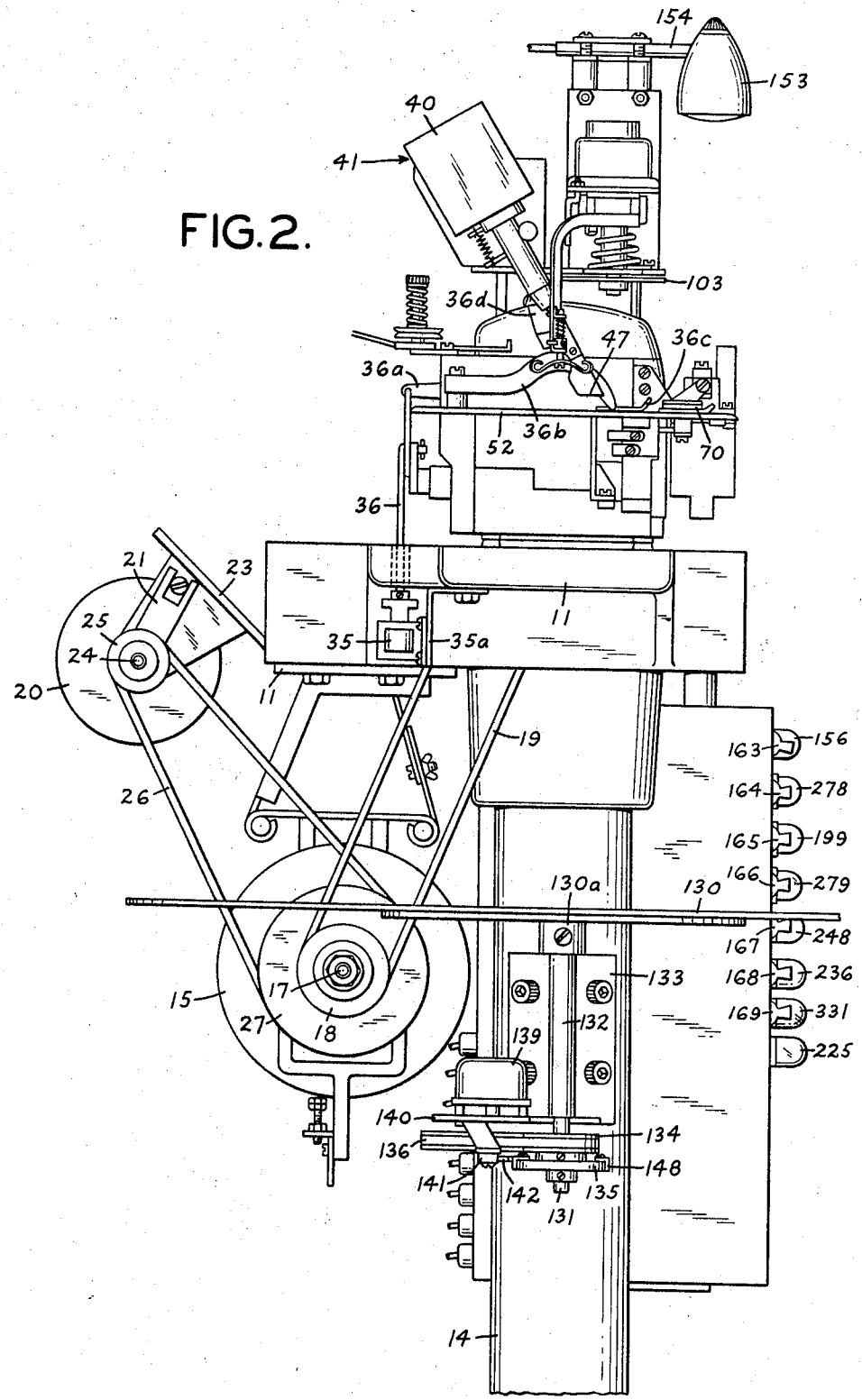

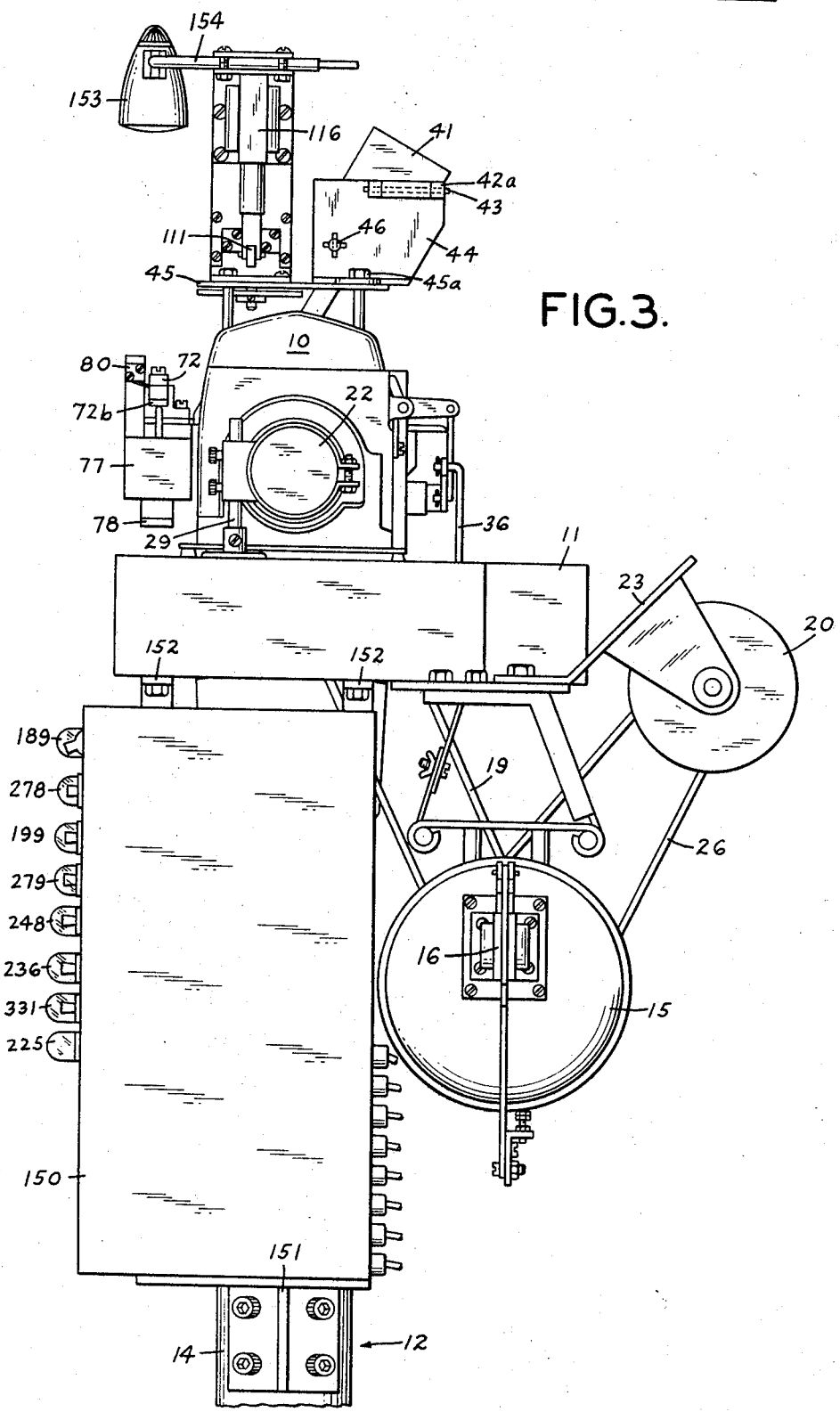

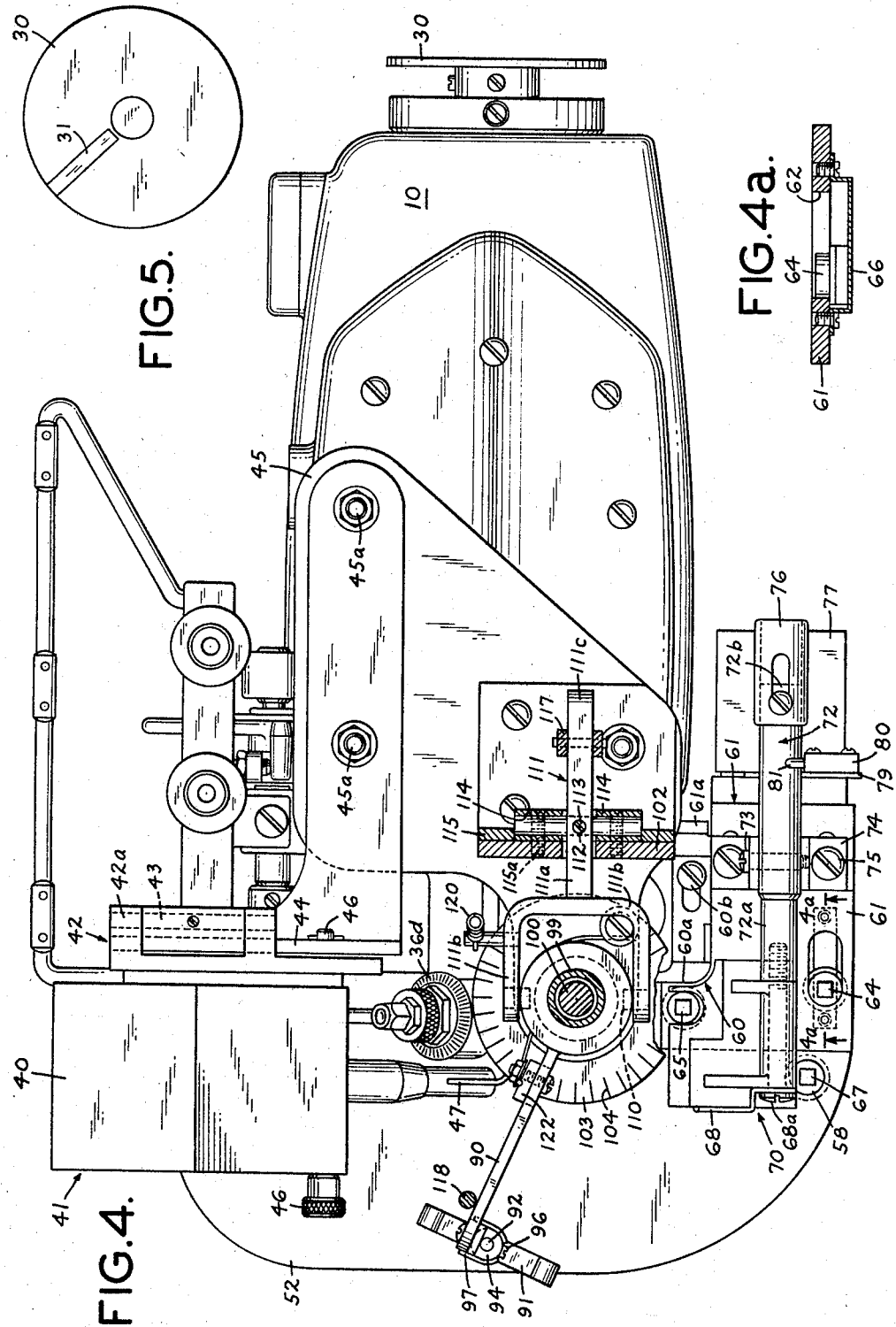

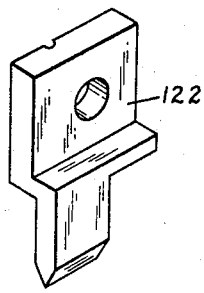
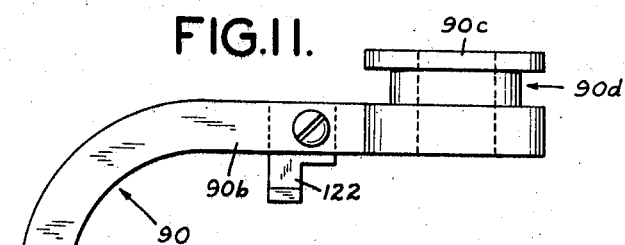
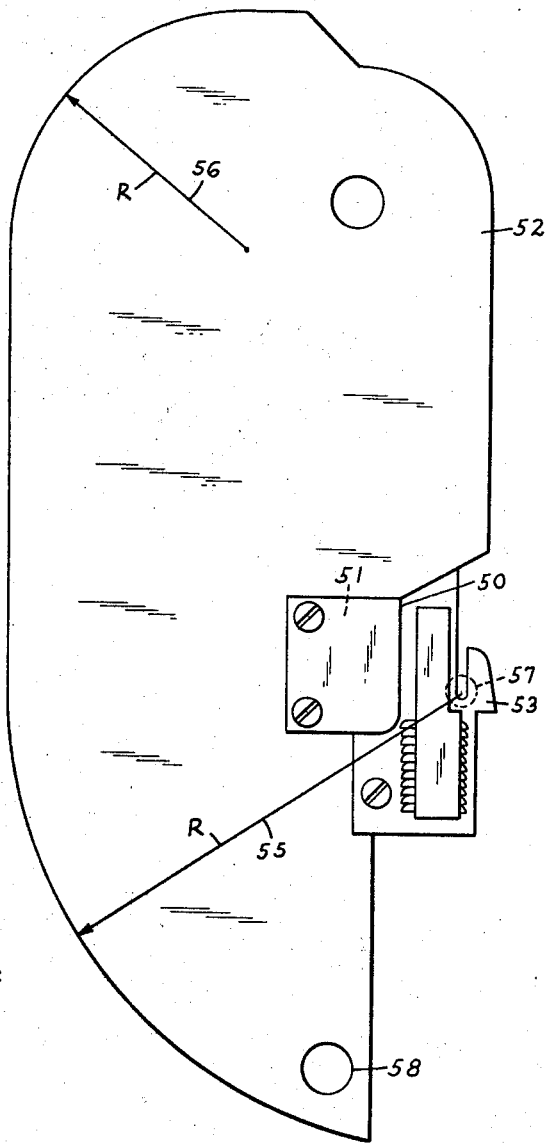
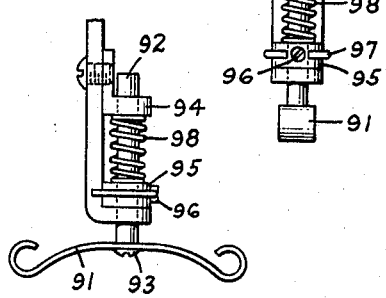
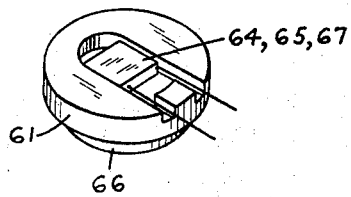
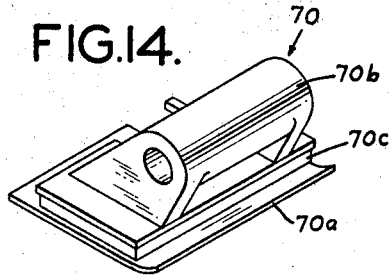

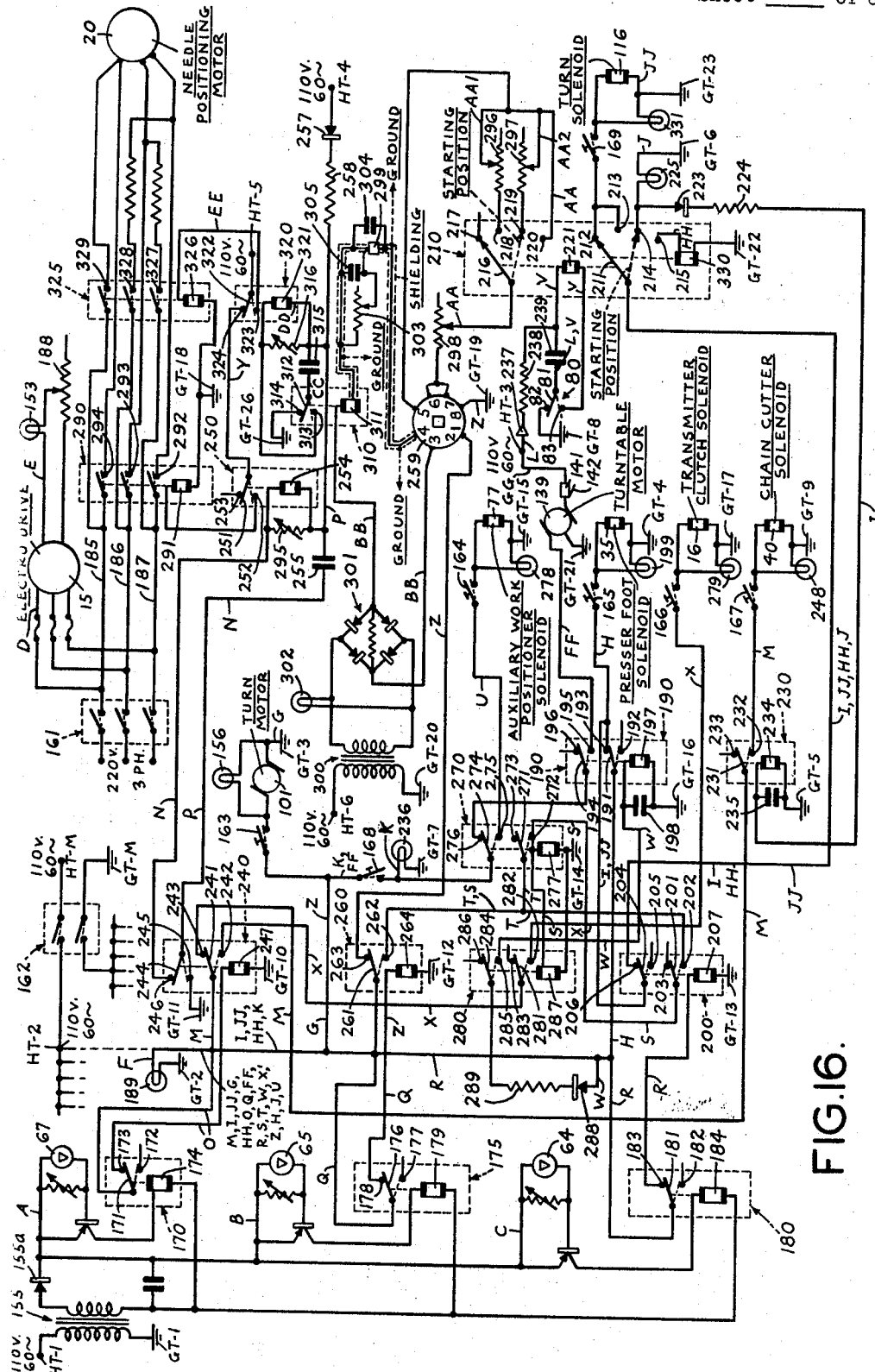

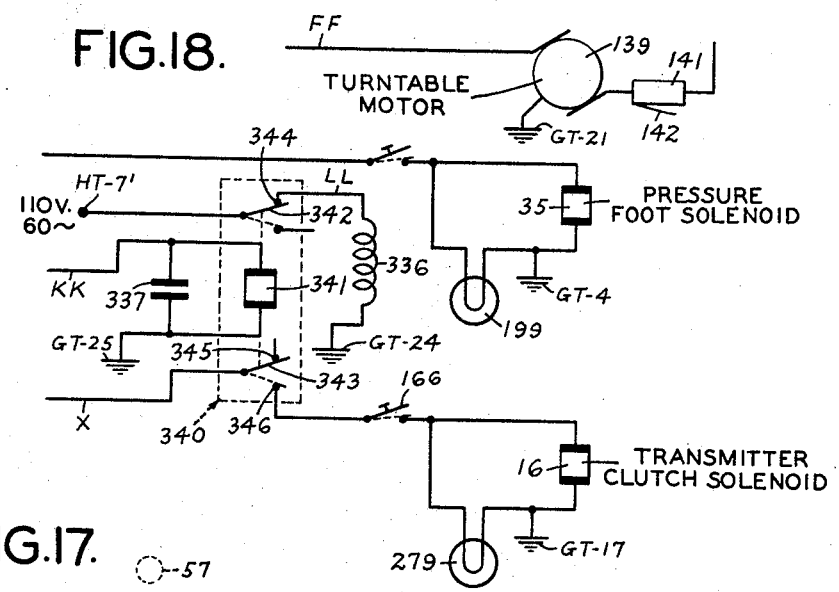
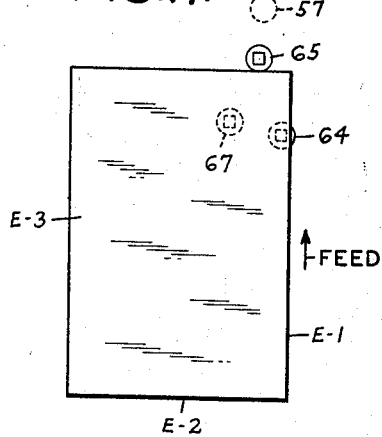
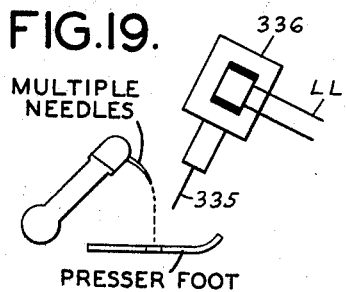
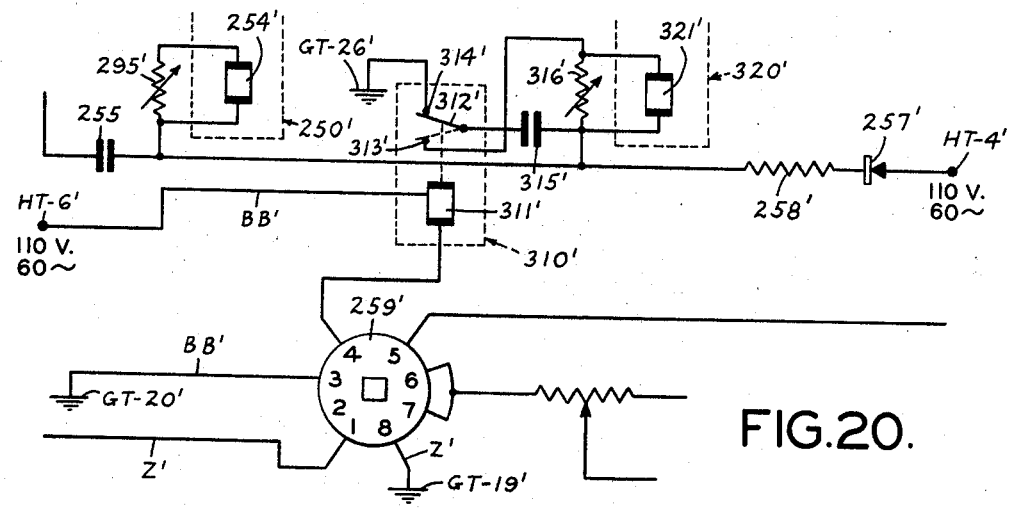

United States Patent Office 3,425,369
Patented Feb. 4, 1969

3,425,369
AUTOMATIC SEWING APPARATUS
Robert L. Kosrow, Elk Grove Village, Ill., assignor to Union Special Machine Company, Chicago, Ill., a corporation of Illinois
Filed July 12, 1966, Ser. No. 564,613
U.S. Cl. 112—2
Int. Cl. D05b 23/00; D05c 3/02
33 Claims This invention relates to a combination of devices for automatically controlling the movement of successive work pieces through the stitch forming zone of a sewing machine. It includes a variety of different means operated in correlated sequences for producing a predetermined result in the seaming of a plurality of work pieces successively supplied to the apparatus.

An important feature of the invention is that the plurality of automatically controlled devices incorporated in the apparatus insure the performance of the desired stitching without any special control by the operator. All that the operator needs to do is to supply successive work pieces to the apparatus and the latter will perform a succession of operations on the work pieces so applied to perform a series of stitch forming operations thereon.

The apparatus involved in the present invention is such that a relatively inexperienced operator may introduce successive work pieces from a stack to the input end of the apparatus and the latter will perform a series of operations upon the successive work pieces to produce a predetermined end result. Various automatically operated devices are included in the apparatus for achieving this end result. These devices include: (1) means for guiding an edge of the work piece, which may be of any desired contour, to and through the stitching zone of the sewing machine; (2) a presser foot for retaining the work against a work supporting surface as the stitching proceeds; (3) means for turning the work about a needle engaged with the work, or about the thread extending from the needle to and through the work, to cause stitching of the work by the sewing machine successively along a number of edges of the work, said last mentioned means being capable of turning the work piece through a sharp angle automatically upon completion of stitching of an edge; (4) means for arresting the operation of the work feeding and stitch forming mechanism when the work piece is being turned through a sharp angle; (5) means for predetermining the number and extent of sharp angle turning movements imparted to successive work pieces; (6) means for controlling the action of a presser foot and other work engaging means for enabling such turning movement of the work; (7) means for producing a desired number of free stitches upon completion of the desired lines of stitching in the work; and (8) means for severing the free stitches upon passage of the work to a desired point.

Included in the foregoing combination of means, and the devices for controlling their automatic operation, are a number of special features. Thus the sewing machine is provided with a work support or cloth plate disposed largely to the left of the stitch forming zone and extending a suitable distance forwardly and rearwardly of the stitch forming zone. This cloth plate has curved surfaces at its forward and rearward ends, at the left side thereof, adapted to cooperate with downwardly hanging portions of the work piece prior to and subsequent to, respectively, the advance of the work through the stitch forming zone. These curved edges serve, through a torque force resulting from friction and the gravitational force of the downwardly hanging portions of the work, to urge the upstream end of the work slightly toward an edge guide adjacent the work feeding and stitch forming mechanism of the machine. As a result of these gravitational forces the work is caused to be guided properly through the stitch forming zone and to retain the edge of the work being stitched against said guide, thus insuring movement of the edge of the work being stitched along the proper path even when such edge has a curved contour in conformity with the purpose of the work piece, which may for example be a trouser leg section to certain edges of which a serging line of stitching is applied.

A further feature of the invention is the provision of an intermittently rotated turntable which is disposed a suitable distance below the cloth plate of the machine. A part of the overhanging work at the front of the machine rests upon this turntable and is given a slight movement toward the line of feed of the edge of the work being stitched. This serves to supplement the above-mentioned tendency of the overhanging portion of the work at the front or upstream end to be urged toward the line of stitch formation. At the same time this turntable assists in pulling the downstream portion of the work slightly toward the left as a particular line of stitching has been completed. This insures carrying the trailing line of free stitches away from the line of stitch formation toward the left into the path of a cutter which severs the free stitching. This cutter has its cutting edge disposed substantially parallel with the line of stitch formation.

Another feature of the invention is the provision of a plurality of light sensitive devices which, upon being exposed to a beam of light, serve to control certain of the devices in the machine. One of these light sensitive devices is so arranged and connected into the electrical control system of the machine as to sense sharp turns in the edge of the work which call for turning of the latter about the needle or about the thread extending from the needle to and through the work. The arrangement is such that when the turning mechanism is brought into play, the sewing machine will be temporarily stopped until the new edge to be sewn is substantially alined with the line of stitch formation. Upon completion of the turning of the work, the operation of the sewing machine is resumed to stitch the new edge line presented to the work feeding and stitch forming mechanism. Correlated with the turning mechanism is a timer unit which is adapted to bring about the stitching of a desired number of sharp angularly disposed edges of the work, and when the selected number of such edges have been stitched the operation of the sewing machine is continued for a number of cycles to form a line of free stitches trailing the last stitched edge of the work. In the course of forming these free stitches, the work is pulled toward the left from the stitch forming zone, and the free thread is carried into a position in which the thread cutter is adapted to sever the chain.

While it has been found possible to bring about the sharp angle turning of the work by the turning mechanism mentioned above with the needle in any position, i.e., either engaged with the work or disengaged from it, in the latter instance the turning taking place about the axis provided by the thread extending downwardly from the needle into the work, a preferred embodiment of the invention includes means for insuring stopping of a single needle machine, upon completion of the stitching of one edge, with the needle engaged with the work. In the case of a multiple needle machine, serving to provide two lines of stitching simultaneously, it has been found desirable to stop the machine while the needles are in their upper position disengaged from the work, and then another non-stitching needle is operated to engage the work at an appropriate point to provide the axis about which the sharp angle turning of the work takes place.

Other features of the invention will be made apparent from the following detailed description of a preferred embodiment thereof, with certain variations therefrom being suggested.

The preferred embodiment of the invention, and certain variations thereof, are shown in the accompanying drawings in which:

FIG. 2 is a side elevational view of the apparatus as seen from the left in FIG. 1;

FIG. 3 is a side elevational view of the apparatus as seen from the right in FIG. 1;

FIG. 4 is a top plan view of the apparatus, with certain parts shown in section;

FIG. 4a is a detail view, in section, showing the mounting of one of the light sensitive elements embodied in the apparatus;

FIG. 5 is an elevational view of a disk secured to the main drive shaft of the sewing machine for controlling the brake applying means and needle positioning means embodied in the illustrated apparatus;

FIG. 6 is a top plan view of a member which controls the timing of the operation of certain devices;

FIG. 7 is a side elevational view of the member shown in FIG. 6;

FIG. 8 is a front elevational view of the work turning mechanism embodied in the apparatus for turning the work through a desired angle when sharp corners of the work are reached;

FIG. 9 is a plan view of an auxiliary cloth plate provided on the machine;

FIG. 9a is a side elevational view of the auxiliary cloth plate as seen from the right in FIG. 9;

FIG. 10 is a plan view of the main work support or cloth plate of the machine, with certain auxiliary devices applied thereto in the stitch forming region;

FIG. 11 is a detail view in elevation of the work turning arm incorporated in the mechanism shown in FIG. 8;

FIG. 12 is a detail view showing the lower portion of the work turning arm as seen from the left in FIG. 11;

FIG. 13 is a perspective view of an element secured to the work turning arm adapted to cooperate with a driving disk;

FIG. 14 is a perspective view of a work engaging member cooperating with the cloth plate;

FIG. 15 is a perspective view, as seen from below, of an element which retains one of the light responsive means, it being understood that each of the other light responsive means is retained by a similar element;

FIG. 16 is a diagram showing various electric circuits and devices incorporated therein for controlling the operation of various devices in the apparatus;

FIG. 17 is a diagrammatic view of a rectangular work piece showing its direction of feed and relationship to the light responsive elements in the course of advance of the work piece;

FIG. 18 is a diagrammatic view showing certain changes that may be made in the electrical circuitry of FIG. 16, adapting the system for use in connection with a multiple needle sewing machine;

FIG. 19 is a schematic view, in elevation, showing the work engaging and retaining needle embodied in a system of the character involving a multiple needle sewing machine; and FIG. 20 is a diagrammatic view showing a modified form of a portion of the circuitry system disclosed in FIG. 16 that may be utilized in a system not provided with a needle positioning mechanism at the time the sewing machine is stopped upon completion of a line of stitching along an edge of a work piece.

Figure 1:
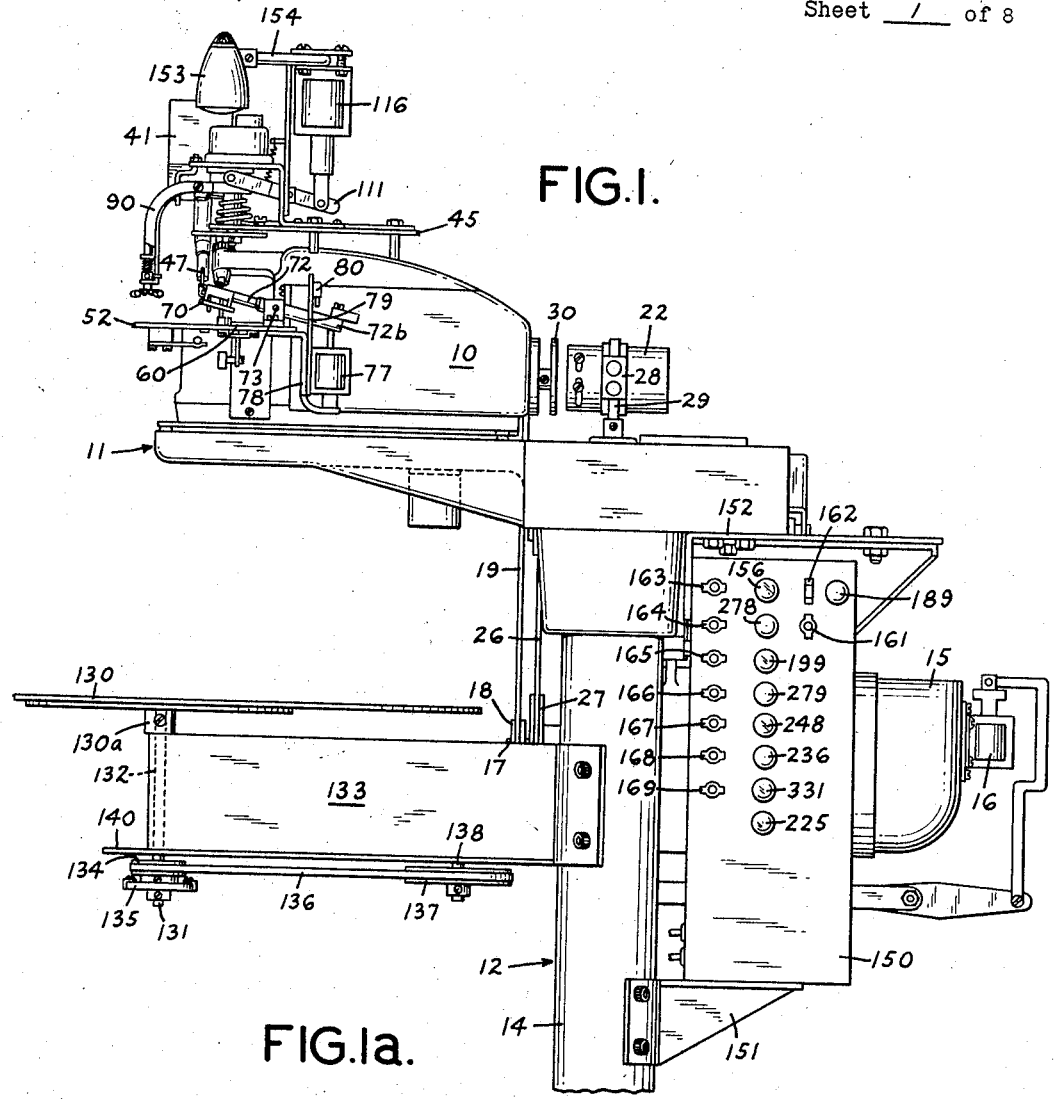
FIG. 1 is a front elevational view of a sewing machine, a supporting structure therefore, and a plurality of associated control devices.

Turning now to the drawings, the primary embodiment of the invention has been shown in relation to apparatus for effecting the serging of sections of trousers and the like. For this purpose the apparatus includes a sewing machine 10 of the overedge sewing type sold by Union Special Machine Company under the designation 39500 S. It should be understood, however, that the invention is adapted for the performance of a variety of other types of sewing operations such as, for example, the stitching together of two sections of material that have been temporarily connected together, one on top of the other, by basting or other means. The sewing machine 10 illustrated in FIGS. 1–4 is of the character shown in the U.S. patent to Kosrow No. 3,116,705, granted on Jan. 7, 1964. It is mounted on a table top 11 carried by a supporting structure 12 having a floor engaging base (not shown) of conventional form, and an upright column 14. An electric transmitter 15, comprising an electric motor and a clutch unit is secured to the undersurface of the table top 11. It is positioned toward the right of the sewing machine, as shown in FIG. 1, and to the rear of the sewing machine, as shown in FIG. 3. For operating the transmitter clutch there is provided a solenoid 16 (FIG. 1) arranged to be operated in the manner to be hereinafter described. The mounting of the transmitter 15 and the solenoid 16 is of the character disclosed in the above-mentioned patent to Kosrow, but with the parts arranged somewhat differently in relation to the sewing machine.

For quickly stopping the sewing machine at various times in the course of operation of the apparatus it is provided with a needle positioning mechanism of the character disclosed in the pending application of Kosrow et al. Ser. No. 474,712, filed July 26, 1965. This incorporates means for stopping the machine with the needle in a predetermined position. As has been stated above, one embodiment of the present invention to be described in detail hereinafter, does not require the stopping of the machine with the needle in any particular position, but it is preferably provided with mechanism of the general character of that disclosed in said pending Kosrow et al. application, including a separate motor to insure the quick stopping of the sewing machine. This is desired in accordance with the present invention whenever the work piece is being turned after the completion of the stitching of one edge thereof and prior to the commencement of the stitching of another edge disposed at a sharp angle to the one that has been completed. The needle positioning means incorporated in the preferred embodiment of the present invention comprises a high torque, low inertia induction motor 20 equipped with a one way clutch driving means 21 (FIG. 2), an electrical control system involving suitable circuits, and a photoelectric sensor 22 for controlling the operation of motor 20. This motor is mounted on a bracket 23 secured to and extending from the rear surface of the table top 11, as best shown in FIGS. 2 and 3. The motor has a shaft 24 which carries the one way clutch means 21 and a drive pulley 25, the latter being connected by a belt 26 with a pulley 27 secured to the transmitter shaft 17. Sensor 22 comprises a light source and photoelectric switch means suitably arranged in a housing secured to a vertically adjustable block 28 mounted on a stud 29 secured to the table top 11. As seen in FIG. 1, the sensor 22 is positioned in axial alinement with a disk 30 secured to the right end of the main shaft of the sewing machine adjacent the drive pulley of the latter. As shown in FIG. 5, the disk 30 carries on its outer face, which is opposite the sensor 22, a reflector strip 31, which in the manner explained in the above-mentioned Kosrow et al. application determines the stop position of the needle at the desired time. Fixedly secured to the transmitter shaft 17 is a further pulley 18, as shown in FIG. 2, which is adjacent the above-mentioned pulley 27 secured to said shaft. Pulley 18 cooperates with a pulley on the sewing machine shaft by a belt 19. As shown in FIG. 2, the pulley 18 is of smaller diameter than the pulley 27. The arrangement is such that operation of the motor 20 at a speed of about 1750 r.p.m will drive the sewing machine shaft at about 1200 r.p.m., and as will be later explained the motor 20 will impart a quick braking or stopping action to the sewing machine when the motor 20 is supplied with current tending to drive the same in the reverse direction.

There are various solenoids in the system for operating certain of the devices therein. This enables the operation of those devices under electrical control. Thus a solenoid 35 (FIG. 2) is provided to automatically lift the presser foot from the work, and thereby interrupt the feeding of the work by the work feeding mechanism of the sewing machine when desired. This solenoid is secured to a bracket 35a which has its upper end secured to the underside of the table top 11. Suitable link or chain connections 36 from the armature of the solenoid serve to connect the latter with a lever 36a which is connected with a shaft that serves to rock a presser foot carrying arm 36b upwardly, i.e in a counterclockwise direction (FIG. 2). A presser foot 36c is pivotally connected with the outer end of the arm 36b. The latter is normally spring urged downwardly by spring means within a housing 36d, such spring means being adjustable to vary the downward pressure applied to the presser foot in the conventional manner. Such presser foot mounting and downward urging under an adjustable spring pressure is incorporated in the 39500 S machine referred to above. The means for energizing the solenoid 35 to lift the presser foot in the manner explained will be hereinafter described in relation to the circuitry shown in FIG. 16.

Another solenoid 40 is provided for actuating a chain cutter 41. It is designated generally at 41 in FIG. 2. This solenoid is mounted above the work supporting table and disposed at an angle as shown in FIG. 2. The solenoid is secured to a generally vertically disposed bracket 42 (FIG. 4) having at its upper end a hinge portion 42a swingable about a hinge pin 43 carried by the upper end of a vertical extension of an angle bracket 44. The base portion of bracket 44 is secured to a horizontally disposed plate 45 which in turn is secured to the top of the sewing machine by bolts 45a. A lock screw 46 serves to maintain the cutter in its operative position but permits, upon being unlocked, the swinging of the cutter upwardly about the axis of the hinge pin 43. This is primarily for the purpose of providing access to the stitch forming mechanism of the sewing machine whenever desired. The chain cutter mechanism 41 is similar to that shown in the above-mentioned Kosrow patent, but differs from the latter in that the cutting blade is disposed with its cutting edge extending in the direction along which the work is advanced by the feed mechanism of the sewing machine. A portion of the cutter is shown at 47 in FIG. 4, and the position of the blade is shown in FIG. 2. When the solenoid 40 is energized the blade of cutter 47 is urged downwardly into cooperation with a hardened surface plate 50 mounted in a recess 51 formed in the top of a cloth plate 52 (FIG. 10) provided on the sewing machine. As shown, the plate 50 is located to the left of the needle slot provided in a throat plate 53 connected with the frame of the sewing machine. As will be explained more fully hereinafter, the solenoid 40 will be activated to cause downward movement of the cutter blade against the plate 50 when the stitching of a work piece has been completed and the latter is being deflected toward the left in FIG. 10 by the weight of the overhanging portion of the work piece along the left edge of the cloth plate 52. As has been previously stated, the cloth plate 52 is of quite narrow construction so that there will always be a portion of the work piece extending downwardly from the left edge of the cloth plate. By virtue of the lateral movement of the work piece toward the left, upon the completion of the seaming operation thereon, the free thread chain that is produced by the sewing machine will be carried across the path of the cutting edge of blade 47 at the time this is operated by solenoid 40. As shown in FIG. 4, the shank 47 of the cutter blade has a portion extending at an angle toward the right to place the cutting edge of the blade quite close to the left hand side of the presser foot. This serves to bring about cutting of the free chain of thread as close to the stitch forming zone as possible.

The work support or cloth plate 52, as shown in FIGS. 4 and 10, has curved edges at its upstream and downstream ends, the curves of these edges having relatively large radii. That at the upstream end has a radius indicated at 55 in FIG. 10 with its center of curvature being at the point where the needle passes through the throat plate 53, as indicated at 57. This radius is somewhat larger than radius 56 of the curved edge at the downstream end of the cloth plate.

The cloth plate 52 has an opening 58 adjacent its upstream end, as shown near the lower end of FIG. 10, for the reception of one of a series of light responsive means incorporated in the system for controlling the proper advancing movement of the work pieces. A member 60 (FIG. 4) having a work guiding edge 60a, is positioned upstream a slight distance from the stitch forming and work feeding mechanism of the sewing machine. Member 60 is adjustably mounted on an auxiliary cloth plate 61, and it is held in adjusted position by a screw 60b. By virtue of the form of the work support 52, including its narrowness and the curvature along the arc of radius 55, with the work overhanging this curved edge of the work support, a small frictional force is applied to the work as it is advanced along said curved edge, thereby applying a torque to the work so that the right edge of the work piece that is being advanced through the stitching zone will be urged against the guide edge 60a. Accordingly if the edge of the work piece being stitched is curved to a certain extent, successive portions thereof will be urged against the guide edge 60a by the combination of the torque mentioned and the advancing movement imparted to the work by the feed mechanism of the sewing machine. The auxiliary cloth plate 61 is disposed to the right of the portion of cloth plate 52, which is in the region shown at the lower end of FIG. 10. It has the form shown in FIGS. 9 and 9a. An upstanding portion 61a of this auxiliary cloth plate is provided for attachment of the same to a part of the frame of the sewing machine. Two openings 62 and 63 are provided in cloth plate 61 for the reception of light sensitive members 64 and 65, respectively. These light sensitive devices are contained in Lucite housings of the character shown in FIG. 15. It will be understood that the Lucite of which the housings are formed will transmit light to the light sensitive devices retained by them. In FIG. 4a there is shown a manner of retaining the light sensitive device 64 within the opening 62 of auxiliary plate 61. Due to the lateral length of the opening 62 provision is made for adjusting somewhat the lateral position of light sensitive member 64, and the latter is retained in adjusted position by means of a bracket member 66 secured by screws to the undersurface of auxiliary plate 61. This is to enable the control over the movement of work pieces when different types of stitching are applied thereto adjacent to or directly over the right edge of the work piece. On the other hand, the light sensitive member 65 is retained in a fixed position by insertion of its Lucite housing in the circular opening 63 of auxiliary plate 61. The purposes served by the light sensitive members 64 and 65 will be later explained.

A further light sensitive device 67 is provided for the controlling of certain devices incorporated in the apparatus, in the manner to be explained hereinafter. This light sensitive device is of the same character as those designated 64 and 65 and it is retained in the opening 58 of the cloth plate 52.

To assist in controlling the proper movement of the work pieces toward and through the stitch forming zone, a plurality of means are provided for urging the work against the cloth supporting means. These are members 68 and 70 which supplement the action of the presser foot 36c. It is important that the torque forces imparted to the work as a result of its engagement with the left edge of the cloth plate 52, due to the frictional resistance of the cloth along said edge, be held within controllable limits. It is for this purpose that the cloth plate 52 is relatively narrow so that the leverage through which the frictional, torque force is imparted to the work is lessened as compared with what would exist if the cloth plate were wider. Also as will be explained, the weight of the overhanging portion of the cloth which enters into the frictional and torque forces mentioned is held within desired limits by the provision of a rotating support for any such overhanging material exceeding a desired amount. This rotating means has been referred to in the foregoing and will be more fully described hereinafter.

Member 68 is a spring element secured by a bolt 68a to the member 70. A free end of this spring member is arranged to urge a portion of the work against the table 52 in the region in which it is engaged therewith, whenever it and the member 70 are retained in their active positions.

The member 70, to which the element 68 is connected as described above, has a bottom plate or sole 70a which is turned upwardly slightly at its forward or upstream end in the manner of a pressed foot. It extends transversely of the direction of movement of the successive work pieces. The details of the construction of member 70 are best shown in FIG. 14. As there shown it has a shank portion 70b which is rigidly secured by means of the screw 68a to the left-hand end 72a of a transversely disposed rock member 72 (FIGS. 1 and 4). This rock member is pivotally mounted on a stud 73 having a screw threaded end connected with a bracket 74 attached to the auxiliary cloth plate 61 by screws 75. The portion 72b of the member 72 extending to the right (FIG. 4) of the pivot stud 73 is weighted to normally cause a clockwise movement of the member 72 into the position shown in FIG. 1. For this purpose an adjustable weight 76 is secured to the right end of member 72 to insure the normal rocking of the member in the manner described. At an appropriate time in a cycle of operation of the machine the member 72 is rocked in a counterclockwise direction to carry the plate 70a into engagement with the work being fed and stitched. For this purpose a solenoid 77, which is energized by suitable circuits to be described, has its armature arranged to engage the portion of the member 72 adjacent its right end and thus carry the left end of the member 72 downwardly, thereby causing the bottom plate 70a of member 70 to engage the work and force it under a suitable pressure against the main and auxiliary cloth plates. Between the bottom plate 70a and the shank portion 70b of member 70 there is provided a rather soft padding 70c which serves to level the sole 70a when the latter engages the work. Solenoid 77 is mounted on a bracket 78 (FIG. 1) secured to the frame of the sewing machine. Fastened to this bracket is another strip shaped bracket 79 which carries adjacent its upper end a microswitch 80. The latter has an element disposed in the path of the rocking movement of member 72, so that when the solenoid 77 is energized to rock the member 72 the latter will operate the microswitch to close a circuit to be hereinafter described in relation to the circuit diagram of FIG. 16. Suffice it to say here that this microswitch serves to energize a relay which determines the sequence or cycle of closing certain circuits that are involved in the control system.

An important feature of the invention is the automatic means for turning the work through a suitable angle, such as 90°, upon completion of the stitching of one edge of the work to bring another edge of the work into position for being advanced and stitched. This work turning mechanism is best shown in FIGS. 4, 8, 11, 12 and 13. It comprises an element 90 having a vertically extending portion 90a and a horizontally extending portion 90b. The latter, at its right end (FIG. 8), is provided with an upward extension 90c provided with a groove 90d adapted to receive means for lifting and lowering the member 90. At the lower end of portion 90a there is mounted a spring urged work engaging element 91 having a stem or stud portion 92 carrying a collar 95 rigidly secured thereto by a screw 96. The work engaging member 91 is formed of spring material and preferably has the configuration shown in FIGS. 11 and 12. It is secured by a screw 93 to the lower end of the stud 92, the upper portion of said stud being vertically slidable in the bracket 94 secured to the downwardly extending portion of the member 90. The collar 95 is adjustably mounted on the stud 92 by means of the screw 96, which may be loosened whenever desired to adjust the position of the collar in relation to the stud 92. Welded to the periphery of the collar 95 at diametrically opposite locations are two wire pieces 97 which engage the sides of the vertical portion 90a of member 90 and thus prevent turning of the stud 92 and the work engaging element 91 in relation to the member 90. A coil spring 98 surrounding the stud 92 and having one end cooperating with the bottom of the bracket 94 and its other end cooperating with the top of the collar 95 serves to urge the stud downwardly under a suitable spring force.

The horizontal portion 90b of the member 90 has its enlarged portion 90c slidably and rotatably mounted on a vertically disposed sleeve 99 (FIGS. 4 and 8). The axis of sleeve 99 is substantially concentric with the vertical centerline of the point at which the needle enters the work. This sleeve surrounds a downwardly extending shaft 100 of an auxiliary gear motor 101. Sleeve 99 is disposed between the bracket plate 45 and an upper horizontally extending portion 102a of a double angled bracket member 102 mounted on the bracket plate 45. Motor 101 is mounted on the top of the horizontally extending portion 102a of bracket 102 and has its shaft 100 extending through apertures in said bracket portion and the lower bracket plate 45. To the lower end of shaft 100, which projects below the bracket plate 45 there is secured a disk 103 having on its top face a plurality of equidistant, radial serrations 104, as best shown in FIG. 4. This disk is rotated counterclockwise at a constant rate of speed.

The peripheral groove 90d in the enlarged end portion 90c of the horiontally disposed part of member 90 is adapted to receive at opposite sides pin members 110 projecting from the inner faces of prongs 111b of a rock lever 111. This rock lever has secured thereto at an intermediate point a pin 112 (FIG. 8), this being retained in fixed position on the lever by a screw 113 (FIG. 4). Pin 112 is journaled at its opposite ends in bearing members 114 which are mounted in an aperture extending through a vertically disposed bracket 115 which is secured to the vertically extending part of the double angled bracket 102 by means of screws 115a. Adjacent the right end of rock lever 111, as shown at 111c in FIG. 8, there is pivotally connected the lower forked end of a link 117, the opposite end of which is pivotally connected with the lower end of the armature of a solenoid 116. This solenoid is secured to the vertical bracket 115 by means of bolts 116a.

Whenever the solenoid 116 is not energized, the lever 111 is rocked in a clockwise direction by a spring 120 having its lower end connected with the bifurcated portion of the rock lever and its other end connected with a pin 121 having screw threaded engagement with the solenoid support bracket 115. This lifts the turning element 90 into an inactive position. A torsion spring 123 beneath the enlarged portion 90c of the turning element has one end connected with the latter and its other end connected with a screw 124 threaded into bracket plate 45. The force of the torsion spring 123 serves to turn the element 90 in a clockwise direction into a position in which the horizontally extending portion 90b of the element engages a stop member 118 (FIGS. 4 and 8). This stop element 118 may be adjusted angularly to retain the arm 90 under the force of the torsion spring 123 in a position which may be selectively varied to be at an angle of between 90° and 110° to the line of feed of the work. Whenever the solenoid 116 is energized the rock lever 111 is turned in a counter-clockwise direction against the action of spring 120 to carry an element 122 (FIGS. 4, 8, 11 and 13) downwardly into engagement with one of the radial serrations in the rotary disk 103. Since the latter is constantly rotating, this will impart a turning movement in a counter-clockwise direction to the element 90 until the solenoid 116 is deenergized. When this occurs, the rock lever 111 will be rocked clockwise to disengage the element 122 from the serration in rotary disk 103, and the torsion spring 123 will rapidly return the element 90 in a clockwise direction to its normal position in engagement with the stop element 118. As will be later explained, the energizing and deenergizing of solenoid 116 is so controlled as to cause the turning element 90 to turn the work through an angle corresponding with that of the angular relation between adjacent edges of the work piece. Thus assuming that the work piece is of the rectangular configuration shown in FIG. 17, the turning element 90 will serve to turn the work piece through an angle of 90° upon the completion of the stitching of the edge E-1, as the work piece is fed in the direction indicated by the arrow. This will serve to bring the edge E-2 into the line of feed, with this edge then being subjected to the application of a line of stitching. Upon completion of the stitching of edge E-2 the turning element 90 will again be brought into play to turn the work piece through another angle of 90°, thus placing the edge E-3 of the work piece in position for the application of the next line of stitching. It should be understood that if the sharp angles provided in the work piece are other than 90°, for example 60° in the case of a hexagonally shaped workpiece, the turning element will be so controlled as to turn the work-piece through the desired angle to bring another edge of the work-piece into the line of stitch formation. Also, as has been previously stated, a number of turning movements imparted to the work piece by the element 90 may be selected by the proper adjustment of a stepper relay incorporated in the system. When the selected number of sharp angle turns have been imparted to the work, the turning element will not engage and turn the same work piece again, so that the latter is advanced by the feed mechanism of the sewing machine to bring about the formation of a certain number of free thread stitches and to then bring about the severing of the free thread chain.

As has been previously stated, the apparatus of the present invention is provided with a rotary turntable 130 at a selected distance below the sewing machine, preferably about 12 inches below the cloth plate 52. This is to avoid excessive weight being imparted to the work advancing along the surface of the cloth plate which would disturb the proper functioning of the work positioning mechanism. The turntable 130 is turned in a counter-clockwise direction. It has a hub portion 130a secured by a set screw to a vertically disposed shaft 131 journaled in a bearing 132 mounted in the free end of a supporting bracket 133. The latter is secured by bolts to the upright column 14 of the supporting structure. For turning the shaft 131 there is secured thereto a pulley 134 connected by a belt 136 with a somewhat larger pulley 137 secured to the free end of a downwardly extending drive shaft 138 of a gear motor 139 (FIG. 2) which is mounted on a horizontally disposed platform 140 secured to the under surface of the bracket 133. Below the pulley 134 there is also secured to the shaft 131 a cam disk 135 shown in detail in FIGS. 6 and 7.

Figure 1A:
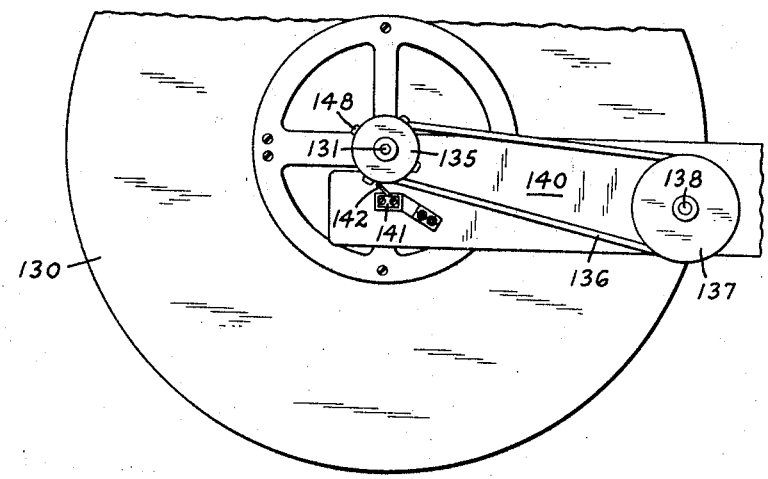
FIG. 1a is a bottom view, partly broken away, of the turntable and its driving means.

The platform 140 extends along the bottom of bracket 133 and projects outwardly therefrom. It carries on its under surface a normally closed switch 141 having an actuating arm or contact 142 (FIG. 1a) which is adapted to be engaged and actuated by projections carried by the cam disk 135 to open the switch. Thus as shown in FIG. 6 the cam disk 135 is provided with a plurality of cam members 148 having arcuate portions 148a having elongated openings 148b therethrough which are arcuate in form and concentric with the disk 135, thus permitting angular adjustment thereof in relation to the disk 135. Screws 149 serve to retain the cam elements in properly adjusted position on the disk 135.

As shown in FIGS. 1 and 2, the apparatus includes a switch box 150 mounted on the column 14 and to the undersurface of table top 11 by suitable brackets 151 and 152. This switch box houses the major portion of the wiring for the various control circuits of the system. As also shown in FIGS. 1 and 3 a light source 153 is mounted on the frame structure to establish a beam of light adapted to activate the photoelectric cells 64, 65 and 67 whenever these are not covered by the work being advanced through the machine. The light source 153 is carried by a bracket 154 mounted on the top of the solenoid 116. Switch box 150 carries a plurality of manually operable switches 161–169 for setting the apparatus into operative condition, and at least some of these switches close circuits through lights which indicate when the circuits controlled thereby are in operative condition.

Turning now to the electric circuitry involved in the system for controlling the operation of various devices, the circuitry involved in the primary embodiment of the invention is shown schematically in FIG. 16. FIGS. 18 and 20 show portions of the circuitry which are modified from the showing in FIG. 16 for the purpose of adapting the latter to be used in connection with a two needle sewing machine (FIG. 18) and for the purpose of eliminating the needle positioning function of the system shown in FIG. 16 when desired (FIG. 20). The current supplied to the circuitry system is a 220 volt three phase alternating current which is utilized for driving the motor of the electrical transmitter, designed "ELECTRO DRIVE" in FIG. 16, and the needle positioning motor 20. The rest of the electrical equipment is operated on a 110 volt 60 cycle alternating current which, for the operation of certain of the devices, may be transformed to a lower voltage, and in some instances rectified to direct current flow. The various 110 volt 60 cycle circuits to be described are preferably derived from a different source from that supplied through switch 161 to the Electro Drive. They are connected by way of a switch 162 with a suitable source having terminals HT-M and GT-M. In the schematic illustration of the circuits the terminals of the 110 volt 60 cycle source have various branch terminals denoted by HT or GT followed by a numeral to indicate the particular branch circuit involved.

The photocell circuits are identified as A, B and C. They are of the character illustrated and described in the pending Kosrow application Ser. No. 455,151. These circuits operate on a direct current of suitable voltage derived from a transformer 155 which has one coil connected to the terminals HT-1 and GT-1 of a 110 volt 60 cycle alternating current source. A rectifier 155a is placed in the circuit of the other coil of the transformer 155 to provide a direct current. Upon exposure to light beam from lamp 153, the photocells 64, 65 and 67 are rendered effective to produce signals which, after being amplified, are transmitted to the windings of relays 170, 175 and 180. It should be understood that when the system is put into operation the two switches 161 and 162 will be closed. The closing of switch 161 serves to deliver the 220 volt three phase alternating current to the electro drive through circuit D branching off from lines 185, 186 and 187. This also closes a circuit E through the lamp or light source 153, this circuit including a rheostat 188 which is adjusted to provide the degree of intensity of the light emitted by source 153. The current tapped off through circuit E is maintained at about 6.3 volts. The closing of switch 162 enables a control light circuit F to be energized, this extending from terminal HT-2 through a lamp 189 to terminal GT-2. Another circuit G extends from terminal HT-2 to terminal GT-3 which brings into operation the turn motor 101 that serves to operate the turning element 90 at the appropriate times. A switch 163 in this circuit is normally closed. In parallel with the circuit through the motor 101 is a branch passing through a light 156 to indicate to the operator that the turn motor is in operation. Another circuit from terminal HT–2 is designated H and extends downwardly and then toward the right through the switch arm 191 of the deactivated solenoid relay 190, then through a normally closed switch 165 to the solenoid 35 and down to terminal GT–4. As will be apparent, when solenoid 190 is energized the arm 191 will be drawn downwardly to interrupt the circuit H and thus permit the presser foot to engage the work piece, under the force of the spring in housing 36d as previously described. Solenoid 35, when energized, lifts the presser foot from the work. A branch line in parallel with the solenoid 35 passes through a light 199, which is mounted on the switch box 150, to let the operator know that the presser foot solenoid has been activated.

Still another circuit, designated I, extends from terminal HT–2 to terminal GT–5 by a branch off from circuit H shown at the right side of relay 190. From this branch off the circuit extends through switch arm 204 of deenergized relay 200 to contact 206 and then continues toward the right over to relay 210. This circuit is originally completed through relay 210 when the switch arm 211 of the latter is in engagement with contact 214, which is the starting position of the relay 210 that determines the number of sharp angle turns that are to be imparted to the work by the turning element 90. From contact 214 the circuit I extends through a rectifier 223, a resistor 224 and then down and back toward the left to a capacitor 235 and then to terminal GT–5. After the capacitor 235 is fully charged, the current will be conducted through the coil of solenoid 234, incorporated in relay 230, thus activating the latter. Upon activation of solenoid 234 a switch arm 231 will be drawn downwardly into engagement with contact 232. This serves to complete a circuit M extending from terminal HT–2 through a deactivated relay 240 and then downwardly and toward the right over to the chain cutter solenoid 40 and to terminal GT–9. It will be understood that switch 167 will be manually closed at this time. Therefore at this stage of the operation the chain cutter will be held downwardly against the plate 50 described herein above.

Another circuit J will be completed, as a branch off from circuit I, in the region of relay 210 to terminal GT–6. This branch off circuit carries a lamp 225 which is thus illuminated when the circuit I is completed in the manner described. A control lamp circuit K is also closed from terminal HT–2 to terminal GT–7 through a manually closed switch 168. This circuit includes a lamp 236 which indicates to the operator the closing of this circuit. A capacitor charging circuit L extends from terminal HT–3, shown to the left of the region of the relay 210, this circuit extending from terminal HT–3 through a rectifier 237, a resistor 238 to and through a capacitor 239 over to microswitch 80, through arm 81 of the latter, to contact 82 and then to terminal GT–8. In connection with the foregoing discussion it should be noted that in FIG. 16 the deactivated positions of the various relay switch poles or arms are shown in full lines while the activated positions of these switch poles or arms are shown by dotted lines, with the exception of the multiple contact impulse relay 210·

When the photocells 67, 65 and 64 are exposed to light source 153, because of the absence of any work piece passing over the photocells, the single pole relays 170, 175 and 180 are activated. This is what enables the completion of the circuit M in the manner described above. Furthermore, as long as relay 240 remains in deactivated condition, and switch arm 244 engages contact 246, a circuit N is closed. This, as shown in the upper central portion of FIG. 16 completes a circuit through the coil 254 of a single pole, double throw relay 250 and a capacitor 255. However there is no power supplied to this circuit at this time, since capacitor 255 has not been charged up as yet. The circuit for charging up this capacitor will be hereinafter described.

When a work piece is now introduced into the apparatus with its edge E–1 (FIG. 17) disposed in the direction of feed, the work piece will cover in close sequence the photocells 67, 65 and 64 with the result that the relays 170, 175 and 180, which are respectively in circuits designated A, B and C, will be successively deactivated to bring about the following results. The switch pole or arm 171 of relay 170 of circuit A will be returned by spring action into engagement with contact 173, thereby closing a circuit O extending from terminal HT–2 to terminal GT–10 by way of relay 170 and solenoid 247 of relay 240. This results in activating relay 240, and causes switch pole or arm 244 of this relay to disengage from contact 246, consequently breaking up the circuit N and causing switch arm 244 to engage contact 245. As a result of this, a circuit P is closed to cause current to flow from terminal HT–4, shown at the right end of FIG. 16, through a rectifier 257, a resistor 258, capacitor 255 and relay 240 to terminal GT–11. This current will charge up the capacitor 255. Simultaneously, the other switch pole 241 of relay 240 is disengaged from contact 243, thereby interrupting the circuit M to the knife or chain cutter solenoid 40, thus deenergizing this solenoid so that the knife is raised. At the same time lamp 248 is darkened. Switch pole 241 now engages contact 242 of relay 240, but no further circuit is closed until the photocells 65 and 64 are covered and relays 175 and 180 are deactivated.

When the relay 175 in circuit B is deactivated, the switch pole or arm 176 disengages the blind contact 177 and is returned by spring action into engagement with contact 178, thereby closing a circuit Q which extends from terminal HT–2 to contact 176, contact 178, and the coil of a solenoid 264 of a single pole double throw relay 260. From this coil the circuit continues to terminal GT–12. As a result, the relay 260 is activated, and its switch pole 261 will be disengaged from contact 263 and brought into engagement with contact 262. It may be mentioned that when the main switch 162 was closed, current was delivered through line Z from terminal HT–2 to terminal GT–19, this current flowing through a timer unit 259 which may be of any of a number of well known constructions, such as that sold by the G. C. Wilson Co. under the No. 491–14 and the designation "Remote Time Adjustment." That unit is provided with a potentiometer 298 which is placed in a circuit that extends from the timer unit through the potentiometer and back to the timer unit along one or another of several circuits determined by the arm 216 of relay 210. It will be understood that the potentiometer circuit rendered active by the position of the arm 216 causes certain electronic means in the timer unit to vary the extent of delay in allowing current to flow through the circuit designated BB extending to and through the timer unit. The three circuits designated AA, AA–1 and AA–2, which are closed at different times by the swinging of the arm 216 into engagement with contacts 220, 218, and 219, respectively, serve to bring about the desired delays. The circuit AA, which is completed when arm 216 is brought into engagement with contact 220 provides no additional resistance to the circuit, so that its resistance is determined by potentiometer 298. When arm 216 engages contact 218 to complete circuit AA–1, this introduces a selected amount of additional resistance imposed by potentiometer 296, depending upon the adjustment of the latter. Similarly when arm 216 engages contact 219, which is the starting position of the relay 210, a selected amount of resistance is introduced into the circuit AA–2 by appropriate adjustment of a potentiometer 297.

In connection with the foregoing, it is desired to state that the relay 210 referred to above is of the character manufactured by the Guardian Electric Co. and marketed under the designation "M.E.R. Electrical Reset Stepper."

It contains not only a coil or solenoid 221 to impart impulses to the latter whenever a circuit through it is closed, but it is also provided with a coil or solenoid 330, referred to as a "reset-coil," which when energized serves to swing the arms 211 and 216 upwardly.

Returning now to circuit C which is connected with relay 180, the coil or solenoid 184 of the latter is deenergized as the right edge of the work passes over the photocell 64. This causes switch arm 181 to be swung upwardly under spring action away from inactive contact 182 to contact 183, thereby closing a circuit R from HT–2 to terminal GT–13 through the coil of a solenoid 207 in relay 200. This by downward rocking of switch arm 204 out of engagement with contact 206 into engagement with an inactive contact 205 serves to open the circuit I described above. Also the activation of solenoid 207 swings the switch pole or arm 201 away from inactive contact 203 into engagement with contact 202 which closes a circuit S which extends from terminal HT–2 through switch pole 261 of relay 260 to contact 262 down to contact 202 and from the latter upwardly to the coils of solenoids 277 and 287 embodied in relays 270 and 280, respectively, and from there to terminal GT–14. The energizing of relays 270 and 280 serves to complete other circuits.

One circuit energized by the operation of relays 270 and 280 is that designated T. This extends downwardly from terminal HT–2 to and through pole or arm 261 of relay 260, to contact 262, then through arm 271 of relay 270 to contact 272, then through coils 277 and 287 to terminal GT–14. The purpose of this circuit is to hold the coils or solenoids of relays 270 and 280 in their activated condition even though circuit S may be broken by the exposure of photocell 64 to light, which would result in breaking the circuit R that has energized circuit S. Such exposure of photocell 64 could result, for example from a curved contour of the edge of the work being advanced toward the stitching zone. Another circuit which is completed upon the energizing of relay 270 is that designated U. This extends from terminal HT–2 downwardly and then toward the right to line K to switch arm 274, contact 275 and over to the right through closed switch 164 into and through the Auxiliary Work Positioner solenoid 77 to ground at terminal GT–15. It will be recalled that solenoid 77 actuates the lever 72 to rock the latter and carry the work controlling and guiding member 70 downwardly into contact with the work. A light 278 in parallel with the solenoid 77 is illuminated to show to the operator that the work engaging and guiding element 70 is in its active position. The rocking of member 72 causes the portion 72b thereof to engage the switch pole 81 of microswitch 80, thereby disengaging said switch pole from contact 82 and thus breaking up the earlier described charging circuit L for the capacitor 239. Switch pole 81 will at this time be engaged with contact 83 and serves to close a circuit V which causes the capacitor 239 to discharge its stored current through the coil or solenoid 221 of relay 210. This energization of coil 221 produces an impulse that causes switch poles 211 and 216 to disengage from contacts 214 and 219 and to engage instead with contacts 215 and 220, respectively. As a result of the foregoing movement of arm 211, the circuits I and J to terminal GT–6, previously described, are broken for the second time and a branch line HH is established extending from contact 206 of activated relay 200 to and through a solenoid 330 to terminal GT–22. As contact 206 is open no current is delivered to solenoid 330 so that no resetting of arms 211 and 216 takes place at this time. Arms 211 and 216 are still, at this time, retained in engagement with contacts 215 and 220 respectively. More particularly arm 216 has completed circuit AA connected with the timer unit 259 to exercise a control over the activation of the electric eye incorporated in the needle positioner sensor 22, before the solenoid 330 at the proper, preselected time, brings about the spring restoring or resetting of the arms 211 and 216 into their uppermost position, i.e. in engagement with contacts 212 and 217.

Returning to the circuit BB which has been mentioned above, this is supplied from terminal HT–6 through the coil of a magnetic transformer 300 to terminal GT–20. The other coil of this transformer is connected with a four-way rectifier 301 a branch of which extends over to timer 259 and from the latter upwardly through a photoconductive switch 299 which supplies current to several different branch lines. One of these extends upwardly to the left in FIG. 16 to the coil 311 of relay 310 and from the latter back to the four-way rectifier 301 to the opposite side of the coil of transformer 300. In parallel with this circuit BB is a branch circuit through a light producing member 302 which serves to deliver light to the photoconductive switch 299. The timer unit 259 is started in operation upon the closing of circuit Z. The latter extends from HT–2 to inactivated relay 260 which has its switch arm 261 engaged with contact 263 from which the line Z extends toward the right to the timer unit 259 and to terminal GT–19. This starts the operation of the timer, allowing current to flow through the circuit AA when the switch arm 216 is engaged with contact 220. After the elapse of a preselected delay interval the timer unit acts as a closed switch causing a 6.3 volt direct current to flow to the photoconductive switch 299. A potentiometer 303 is connected in parallel with the photoconductive switch 299 and serves to regulate the sensitivity of the switch to the light derived from light source 302. Such light is directed toward the photoconductive switch by reflection from reflector strip 31 on the disk 30 connected with the drive shaft of the sewing machine. It is this reflected light which puts into play the stopping action of needle positioner motor 20.

It has been found that the photoconductive switch may be triggered prematurely, before it is intended to be triggered by the reflector strip 31. Such premature tiggering may be caused by the rate of change of the voltage upon the closing of the timer switch 259. In order to prevent this a capacitor 304 is connected in parallel with the photoconductive switch, and a second capacitor 305 is connected in parallel with the potentiometer 303. Due to its extreme sensitivity, the photoconductive switch 299 may also be triggered by unrelated electrical signals produced by other components of the control circuitry. In order to prevent any such premature triggering of the switch, it has been found desirable to shield the connections leading to and from the photoconductive switch. This is accomplished by using conventional shielded wires with proper grounding, as indicated in FIG. 16.

The photoconductive switch 299 and the light source 302 are incorporated in the sensor 22, shown in FIGS. 1 and 3. This sensor is held stationary, while the reflector strip 31 is carried by the rotating disk 30 which is connected with the main shaft of the sewing machine. When light from source 302 is reflected by strip 31 toward the switch 299, the resistance of this switch is lowered and permits current to flow as if the switch 299 were a closed switch. This serves to complete the circuit BB and delivers current to the coil or solenoid 311 of a single pole, double throw relay 310, thereby activating the latter with the result that a switch arm or pole 312 is disengaged from contact 314 which is connected with terminal GT–26, and the switch pole 312 engages contact 313 to provide a circuit DD which includes a capacitor 315 and a coil or solenoid 321. In parallel with this solenoid is a variable resistor 316. Solenoid 321 forms a part of a relay 320 provided with a switch pole or arm 322 which is connected with a terminal HT–5. When the solenoid 321 is deactivated, current flows from terminal HT–5 to contact 324, then toward the left through line Y to switch pole or arm 251 of relay 250. Normally the switch arm 251 is engaged with an inactive contact 253, but when the relay 250 is activated in the manner previously explained, by the closing of circuit N and delivery of current from capacitor 255 through the coil or solenoid 254 of relay 250, the circuit Y is completed through contact 252, coil or solenoid 291 in a relay 290, and back toward the right to terminal GT–18. Energization of relay 290 in this manner serves to cause the delivery of current from the 220 volt, three phase source through the switch 161 to the needle positioner motor 20 by the downward swinging of switch poles or arms in the relay 290 from the full line positions shown in FIG. 16 into engagement with contacts 292, 293 and 294. It will be recalled that motor 20 was being driven by connections from the main motor 15, i.e. through the pulley and belt connections 25, 26, 27 (FIG. 2). Assuming it was being driven at say 8000 r.p.m. at this time, the energization of motor 20, as explained above, will quickly reduce the speed of the motor to 1725 r.p.m. and it thus serves to drive the swing machine at the rate determined by the 1725 r.p.m. rotation of motor 20, the transmitter clutch of the electro drive being inactivated at this time. Upon the later energizing of relay 320 its switch arm 322 is drawn downwardly from contact 324 into engagement with contact 323. This breaks up the circuit Y described above, thus deactivating relay 290, and sets up a new circuit from terminal HT–5 through a circuit designated EE which delivers current through a coil or solenoid 326 and from there to terminal GT–18. From the deactivation of relay 290 it follows that contacts 292, 293 and 294 are opened again. When the solenoid 326 of relay 325 is thus energized three switch arms are drawn downwardly from an inactive position to one in which they respectively engage contacts 327, 328 and 329. This brings about an attempted reversal of the operation of the needle positioner motor 20, as compared with that controlled by relay 290, but since the motor 20 has a one way clutch drive, of the character more fully disclosed in the Kosrow et al. application previously referred to herein, its attempted reversal of rotation imparts a quick stopping action to the rotation of the main drive shaft of the sewing machine, thus causing the latter to stop with the needle in engagement with the work in the embodiment of the invention now being described.

An adjustable potentiometer 295 is connected in parallel with the solenoid 254 of relay 250. This enables adjustably controlling the time interval required to discharge capacitor 255. In accordance with the present invention, this adjustment is such that relay 250 is activated for a period longer than the time required for the feeding mechanism to advance the material from the position where it uncovers photocell 67 to the position where it uncovers photocell 65. Also it is important that the variable resistor or potentiometer 316 be so adjusted that relay 320 will remain activated by capacitor 315 for a slightly longer time than relay 250 remains activated. Otherwise circuit Y would be re-established, thus activating relay 290 and causing the motor 20 to start again in the work advancing direction. When relay 250 is deactivated and switch pole 251 closes on contact 253, the circuit Y is interrupted in a second position so that even upon deactivation of relay 320 the relay 290 will not be activated. Therefore no current will be supplied to motor 20 by way of contacts 292, 293 and 294. Accordingly the possibility of restarting motor 20 out of its scheduled cycle is definitely prevented.

When photocell 65 is uncovered and exposed to the light from source 153 the relay 175 is reactivated, thus breaking the circuit Q in the region of switch arm 176 and contact 178. This results in deactivation of relay 260 so that its switch pole 261 will return into engagement with contact 263. As a result, the holding circuit T which supplies current to coils 277 and 287 of relays 270 and 280, respectively, will be interrupted. It should be mentioned at this point that a circuit X is provided from terminal HT–2 down to cross line M to relay 240 and through arm 241 to contact 242, whenever solenoid 240 is activated. From here the circuit X extends downwardly to relay 280 and through the same, when this relay is energized, over to the clutch solenoid 16 to terminal 17. It will be seen that the clutch solenoid will only be energized when circuit X is completed through the relays 240 and 280. Thus it will be seen that the transmitter clutch will be active only so long as the electric eye 67 is covered and either of the circuits S and T is closed. Deactivation of relay 280 serves to provide a second interruption in the circuit X, which has already been interrupted by the earlier deactivation of relay 240, in consequence of the mentioned uncovering of electric eye 67. The second interruption of circuit X occurs between switch arm 281 and contact 282 from which the arm is now disengaged. Also circuit W, which supplies current to relay 190 from terminal HT2, rectifier 288 and resistor 289 through switch arm 284 and contact 285, will be interrupted. However, the relay 190 is not deactivated at this time, since current will flow to it from the capacitor 198, which has previously been charged, thus keeping the relay 190 activated until the capacitor 198 has been discharged through the coil or solenoid 197 of relay 190. The deenergizing of relay 270 will cause circuit U to be broken, thus cutting off the delivery of current to solenoid 77. Accordingly the auxiliary work positioner 70 will be lifted from the auxiliary cloth plate 61 by the rocking of arm 72 upwardly, in a clockwise direction (FIG. 1), and this in turn disengages said arm from microswitch arm 81 of switch 80, thus returning the latter under spring action from contact 83 to contact 82 (FIG. 16). This, as has been explained, serves to close circuit L with direct current flowing from terminal HT–3 to terminal GT–8, by way of rectifier 237 and resistor 238 to the capacitor 239 until the latter is fully charged, at which time the flow of current is stopped. During this time the circuit Z extending from terminal HT–2 to the timer unit 259 and from there to terminal GT–19 is established. As has been stated, the timer unit is of conventional construction and serves to exercise a precise control over the commencement of the stop motion of the needle positioner motor 20. In the embodiment of the invention under discussion, the control over the needle positioner motor 20 is such that the needle of the sewing machine will be engaged with the work closely adjacent to the trailing end of edge E–1 of the material. This is to provide the pivot about which the material can be rotated by the turning mechanism which will now be put into operation.

Due to the particular construction of the apparatus the photocell 65 cannot be arranged in immediate proximity to the point 57 at which the needle enters the work. The sewing machine must therefore continue to operate until the trailing end of edge E–1 has moved through the distance from the photocell 65 to the needle entering zone 57 (FIG. 4). For this reason the operation of the stop motion mechanism is delayed for a predetermined time interval controlled by the timer unit 259. Theoretically there should need to be only a single selected time interval necessary to bring about proper stopping of the needle for each of the three edges of the material (FIG. 17) to be stitched. However it has been found that the time required to advance the material from the photocell 65 to the stitch forming zone varies to some extent from edge to edge. This is due to differences in the contour or length of the several edges to be stitched, and also to the difference in the drag applied to the work as different edges, thereof are being advanced to and through the stitch forming zone. It is for this reason that the relay 210 is adapted to selectively close three different circuits AA, AA–1, and AA–2, which are adapted to provide different amounts of delay by proper adjustment of the potentiometers 296 and 297 as well as adjustable potentiometer 298. It will be understood that switch arm 216 is moved stepwise from one contact to another to select the particular circuit (AA, AA–1, and AA–2) which is active as a particular edge of the work piece is being stitched.

In connection with the foregoing it will be apparent that the transmitter clutch will be operated by solenoid 16 when the circuit designated X is completed. This occurs when solenoid 287 is energized in the manner explained and when the relay 170 is deactivated by the passage of the work over photocell 67, which in turn brings about activation of relay 240 through circuit 0. When the trailing end of the work passes beyond photocell 67, the transmitter clutch solenoid 16 will be deenergized and the sewing machine will no longer be driven by the transmitter 15. The needle positioner motor 20, on the other hand, is energized upon the discharging of capacitor 255 through circuit N. This occurs only after solenoid 240 is deenergized by the activation of relay 170 as the trailing end of the work piece passes beyond the photocell 67. It is at this time that the motor 20 takes over the driving of the sewing machine, which continues for a selected period of time, as discussed above, until the relay 325 is operated to bring about an attempted reversal of the direction of turning of motor 20 which, however, is prevented by the one-way clutch 21 and serves to bring about the quick stopping of the sewing machine in the manner described.

Returning now to the deactivation of relay 270, this causes switch arm 274 to return into engagement with contact 276 to establish a circuit FF extending from terminal HT-2 over toward the right and then downwardly to and through switch arm 274 and contact 276 to switch arm 194 of activated relay 190, which is still activated by current from capacitor 198; to contact 195 of the latter and then to the right through turntable motor 139 to terminal GT-21. This will start the motor 139, and through the pulley and belt connection 134, 136, 137, (FIG. 1a) will begin to rotate the turntable 130 and the cam disk 135. Rotation of the cam disk 135 causes one of its cams 148, which has previously been in engagement with switch arm 142 of microswitch 141, to be disengaged from said switch arm. This establishes a circuit GG extending from terminal HT-3 through the now closed switch 141 to the turntable motor 139 and to terminal GT-21. Consequently power is now supplied to motor 139 through both circuit GG and circuit FF in parallel relation.

Considering what has taken place up to this point in the operation of the apparatus, it may be briefly stated to be as follows: the first sewing cycle has been completed; the clutch solenoid has been disengaged; the sewing machine has been stopped with its needle down in the trailing end of the line of stitching that has been completed, the work piece having been advanced to this point; the auxiliary work positioner 70, 72 has been rocked out of engagement with the auxiliary cloth plate 61; and the turntable 130 has begun to rotate; the turn motor 101 is running and is rotating the serrated disk 103; the presser foot 36c is still engaged with the work piece by the action of the spring in housing 36d as hereinabove explained; and the turning mechanism, arm 90, has not yet been actuated.

By this time enough of the energy contained in capacitor 198 has been discharged through coil 197 to cause the deactivation of relay 190, thus causing contact 195 to be opened, thereby interrupting the flow of current to turntable motor 139 through the circuit FF. However contact 193 is engaged by switch arm or pole 191 to reestablish circuit H from terminal HT-2 to terminal GT-4. This energizes the presser foot solenoid 35, thereby raising the presser foot from the work piece. At the same time a circuit HH is established, this extending from terminal HT-2 to terminal GF-22 shown at the right in FIG. 16. This circuit extends through switch arm 191 of deactivated relay 190 to contact 193 of the latter, then over to the left through a part of line I to switch arm 204 of deactivated relay 200, and from contact 206 of the latter downwardly and toward the right over to impulse relay 210, which at this time has its switch pole 211 engaged with contact 215, and through reset coil 330 to terminal GT-22. Energizing of reset coil 330 causes the release of switch poles 211 and 216 of relay 210 from contact with elements 215 and 220, respectively, and permits them to spring return to contact 212 and blind contact 217, respectively. When this occurs, the circuit HH is immediately broken again, resulting in the deenergization of reset coil 330. Current now flows through circuit JJ extending from terminal HT-2 down to and through deactivated relays 190 and 200 and over to impulse relay 210. From contact 212 the circuit JJ continues through normally closed service switch 169 to and through the turn solenoid 116 to terminal GT-23. This energizes solenoid 116 (FIGS. 8 and 16) and also causes a lamp 331 connected in parallel with solenoid 116 to light up. As has been previously explained, the energization of solenoid 116 serves to rock the lever 111 against the action of spring 120, thus urging the arm 90 downwardly to cause the element 91 to engage the work on the cloth plate 52. Also this serves to carry the end of element 122 into engagement with one of the serrations or grooves in the continuously rotating disk 103. As a result, the turning element is swung at the speed of rotation of disk 103 about the axis of sleeve 99. The work piece is thereby turned about the needle which is at this time engaged with the work piece, such turning being in a counterclockwise direction as viewed in FIG. 4. Edge E-2 (FIG. 17) of the work piece is thus brought into the line of feed. Stopping of the turning movement to assure proper positioning of the edge E-2 is brought about by having that edge cover, in close succession, all three of the electric eyes or photocells 67, 65 and 64 in this particular sequence, thus causing relays 170, 175 and 180 to be deactivated, and thereby bringing about the reactivation of relays 240, 260 and 200. It will be noted that the electric eye or photocell 64 is the last of the three mentioned to be covered by the material. Thus the relay 200 is reactivated through circuit R only after the relays 240 and 260 have been reactivated. This means that circuit JJ through which the turn solenond 116 is energized is not interrupted until the edge E-2 of the work piece has been correctly positioned in the line of feed.

As has been explained, the circuit JJ is completed through the relays 190 and 200 when the latter are in a deactivated condition. As soon as relay 200 is activated, the switch pole 204 is disengaged from contact 206 and thus interrupts circuit JJ. On the other hand, relay 190 cannot be activated without relay 200 being first activated. This is because no current will flow to relay 190 until circuit S has been restored for a brief interval and then sets up holding circuit T for retaining the relays 270 and 280 in activated condition. It is thus apparent that the turn solenoid 116 is deenergized at the instant that relay 200 is reactivated. This occurs when photocell 64 is darkened by the work piece when the latter is turned to the desired extent by means of the turning arm 90. When solenoid 116 is deenergized, the rock lever 111 is pivoted in a clockwise direction under the action of spring 120 (FIG. 8). At this time the turning element 90 is disengaged from the work piece and the element 122 is lifted away from the serrated disk 103, so that the torsion spring 123 becomes effective to rotate the turning element 90 in a clockwise direction until it engages the stop member 118.

With the relays 240, 260 and 200 now activated, the apparatus will operate in the manner described above in relation to the stitching of edge E-1. This brings about the stitching of the new edge E-2. When the stitching of this is completed, the turning of the work in the manner described above will take place again to bring the edge E-3 of the work piece into the line of stitch formation.

With reference to the turntable 130, it should be noted that this starts to rotate upon the deactivation of relay 270, which takes place when the material passes beyond the electric eye or photocell 65. Since relay 190 will also be deactivated by the opening of circuit W through deactivation of relay 280 and after the discharge of capacitor 198, the circuit FF will at this time be interrupted.

However, power will still be supplied to the turntable motor 139 through the circuit GG, which extends from HT-3 through microswitch 141. But this microswitch will be opened and the circuit GG interrupted when switch arm 142 is engaged by one of the cams 148 carried by disk 135. As previously explained, the cams 148 are adjustably mounted on the disk 135, thus enabling their adjustment into a position to select the desired duration of the turntable rotation for each turning of the same.

In the embodiment of the invention shown in FIG. 16, the edge stitching operations are limited to three edges of the work piece, and this necessitates only two turnings of the work in the manner explained above. After the stitching of the last edge E-3 is completed a free thread chain is created and this is then cut by the operation of the chain cutter solenoid 40 through the supply of current along circuit M from terminal HT-2 to terminal GT-9 upon the deenergizing of solenoid 247 of relay 240. When the thread chain is cut the material is permitted to drop onto the turntable 130 from which it may be removed when convenient.

Returning to the function of relay 210, which may be called a stepper relay, it will be remembered that at the commencement of the first sewing cycle on edge E-1, the switch poles 211 and 216 are moved from contacts 214 and 219 to contacts 215 and 220, respectively, by an electrical impulse being imparted to the coil or solenoid 221 of relay 210. A later occurring energization of reset coil 330 serves to move the switch poles 211 and 216 to contacts 212 and 217, respectively. This is after the completion of the stitching operation on edge E-1.

After the first turning operation has been completed, one of the relays that will be reactivated through the circuitry previously described is relay 270. As soon as this is reactivated, the circuit U is closed to cause the rock member 72 of the auxiliary work positioner to rock counter-clockwise by activation of solenoid 77. This causes the switch 80 to be actuated again, thereby closing capacitor discharge circuit V. As a result, the coil 221 of relay 210 will be energized to cause the switch poles 211 and 216 to advance to contacts 213 and 218, respectively. The same cycle of operations is repeated after the second turning of the work piece, by the operation of turn solenoid 116, has been brought about and the sewing of the third edge E-3 is then effected. A further pulse sent to the solenoid 221 of relay 210 in the course of this operation will carry the switch poles 211 and 216 of relay 210 down to contacts 214 and 219, respectively, which is the starting position of the overall system.

The advancement of switch pole 216 to contacts 218, 219 and 220 will selectively set up the circuits AA-1, AA-2, and AA to bring about the desired time delay adjustment that has been described as being due to the variable resistors 296, 297 and 298. The arrangement is such that before the first turning of the work, delay circuit AA is set up. Before the second turning of the work, delay circuit AA-1 is set up, and after the second turn the delay circuit AA-2 is set up. The time delay created by the latter circuit AA-2 is long enough to permit chaining off after the material is fed through and beyond the stitching zone.

After the third and final edge has been stitched and the photocells 67, 65 and 64 are exposed to light again, the relays 170, 175 and 180 are activated, and relays 240, 260, and 200 are deactivated, with the results previously described. Power is now supplied to the circuit designated M extending from terminal HT-2 over deactivated relay 240 to switch pole 231 of relay 230. However, since relay 230 is still deactivated its switch pole 231 engages a blind contact 233. The reactivation of relay 230 is delayed until the capacitor 198 has been discharged and the relay 190 thus deactivated. The time interval for discharging capacitor 198 is such as to allow the needle positioner motor 20 to come to a full stop and to also allow for the formation of a free thread chain after the third final edge of the work piece has been seamed.

Upon the elapse of the discharge time of capacitor 198, and upon the resulting deactivation of relay 190, the circuit H is again closed to cause solenoid 35 to be energized and the presser foot to be lifted. Current also flows through a branch line, branching off from the line extending from relay 190 to solenoid 35 to thus restore the circuit I. This delivers current toward the left to contact 206 of relay 200, then toward the right to switch arm 211 and contact 214 of relay 210, then back toward the left to the coil 234 of relay 230 and to the capacitor 235 which is connected in parallel with the coil 234. The time interval required to charge up capacitor 235, before the coil 234 is energized, will allow the material to drop from the left side of the cloth plate and draw the free thread chain in this direction. After the capacitor 235 is fully charged, the coil 234 is energized and relay 230 is thus activated. This will cause the switch pole 231 to move down into engagement with contact 232 and allow current to flow through the earlier described circuit M, thus energizing the cutter solenoid 40. Knife 47 is thereby carried downwardly toward and against the hardened surface plate 50, thus severing the free thread chain that has been drawn toward the left. At this time the stitching of the three edges of the work piece will have been completed and the apparatus is once more ready for the insertion of a new work piece.

It will be understood that while the illustrated and above described apparatus is constructed to impart only two turns to the work piece and thus enable the stitching of three edges of the work piece, the apparatus could be readily modified to bring about a greater or smaller number of turns of the work piece, and thus the stitching of more or less than three sharp angled edges of the work piece. Such modification would be in the relay 210, involving adding to or subtracting from the number of contacts connected with the timer 259 and solenoid 116, respectively, and adapted to be engaged by the switch arms 211 and 216.

As has been stated, the system may be modified slightly to enable it to take care of a multiple needle sewing machine. The changes in the system that are preferably employed to enable this to be done are shown in FIGS. 18 and 19. The arrangement is such that the needle positioner is adjusted to stop the machine when the needles are up, i.e. out of engagement with the work. This is readily accomplished by arranging the reflector strip 31 on disk 30 in a suitable angular relation to the main shaft of the sewing machine.

In order to provide a pivot about which the work piece may be turned by the member 90 upon completion of the sewing of one edge to then aline another edge with the line of stitch formation, it has been found desirable, in the case of a multiple needle sewing machine, to provide an auxiliary needle 335, shown in FIG. 19, this needle not carrying a thread but serving merely to provide the desired pivot point. It is arranged to enter the material after the sewing machine has come to a full stop upon completion of the stitching of one edge. It is placed in its active position before the presser foot of the sewing machine is raised, and it will be retracted when the presser foot is lowered again.

As shown in FIG. 18, a double pole, double throw relay 340 is provided for controlling the flow of current to a solenoid 336 which operates the auxiliary needle 335. A coil or solenoid 341 is provided in relay 340, and this is placed in a circuit designated KK which is arranged in parallel with the circuit W described in relation to FIG. 16. Thus when solenoid 197 of relay 190 is activated, the solenoid 341 of relay 340 will also be activated by the flow of current through circuit KK to terminal GT-25. It will be noted that solenoid 336 is energized by current flowing from terminal HT-6' through line LL, to and through solenoid 336 to terminal GT-24. However upon the energizing of solenoid 341 of relay 340 through line KK, the circuit through solenoid 336 will be interrupted by the downward swinging of switch pole 342 to an inactive contact. It will be understood that this occurs when the circuit W of FIG. 16 is completed in the manner described, during the time that relay 280 is energized.

Whenever relay 340 is activated it prevents the flow of current through the coil of auxiliary needle solenoid 336 by disengagement of switch pole 342 from contact 344, thus causing the auxiliary needle to be retracted by spring action. At the same time, relay 340 will, by way of its other switch pole 343 allow current to flow through line X to contact 346 and onto and through the transmitter clutch solenoid 16. However, if the current to relay 190 is cut-off, at the times mentioned in relation to FIG. 16, then no current will flow through circuit W and to relay 340 by way of line KK. A capacitor 337 is provided in parallel with the solenoid 341 of relay 340 and will be charged up when the circuit KK receives current. When the current to relay 190 is cut-off, and hence the supply to line KK and to relay 340 is cut-off, the capacitor 337 will discharge its stored energy through the coil 341, thus maintaining relay 340 in activated condition for the time interval required to discharge capacitor 337. This time interval is slightly shorter than that required for capacitor 198 to be discharged through coil 197 of relay 190. Accordingly the auxiliary needle will enter the material before the presser foot is raised, due to the fact that following the discharge of capacitor 337, the relay 340 is deactivated and circuit LL from terminal HT–7′ to terminal GT–24 will be established. With the deactivation of relay 340 the circuit X described in relation to FIG. 16 will be interrupted, since switch pole 343 will then engage a blind contact 345. When the relay 340 is activated again, for the resumption of the sewing operation, the circuit LL will be interrupted by the downward swinging of switch pole 342 out of engagement with contact 344. The other switch pole 343 simultaneously moves down into engagement with contact 346 so that current can flow from line X to and through the transmitter clutch solenoid 16 for starting the operation of the sewing machine.

Conducting the flow of current to solenoid 16 through relay 340 in the manner described is simply a safety measure to insure that the transmitter clutch is not engaged to start the stitching of an edge of the work piece and the advancement of the work piece whenever the auxiliary needle is in its down position.

It is believed that the foregoing description of the modified circuitry of FIG. 18, when considered in conjunction with the embodiment of the invention shown in FIG. 16 and described in relation thereto, will indicate how the modified system carries out the cycle of operation of the system described in relation to FIG. 16, when the sewing machine employed is of a multiple needle type so that the turning of the work by member 90 will be about the axis of needle 335, rather than about the thread carrying needle of a single needle machine.

As has been previously indicated, it is not essential that the needle be engaged with the work at the time the latter is being subjected to the turning movement by the member 90. A pivot about which the work may be turned can simply be provided by the thread extending downwardly from the needle to and through the work. Accordingly, it is possible to arrange for an adjustment of the stop motion device in the earlier mentioned manner so that the sewing machine stops with the needle in upward position. It is also possible to eliminate the needle positioning altogether, and thus simplify the apparatus. This makes it possible to omit certain features of the circuitry shown in FIG. 16 which serve to insure the positioning of the needle within the work at the time the sewing machine is stopped and the work is subjected to the turning action of member 90. The portion of the circuitry shown in FIG. 16 that may be omitted is in the region of the solenoid 300, the four-way rectifier 301, the photoresponsive member 299 and various shielded circuits associated with this. The much simpler circuitry that it is possible to use with this modification of the system is shown in FIG. 20.

As shown in FIG. 20, a circuit BB′ replaces the circuit BB of FIG. 16 and other parts of that circuitry. Circuit BB′ extends from terminal HT–6′ over to solenoid 311′ of relay 310′ and from the latter down to the timer unit 259′, and from position 3 on the latter to the terminal GT–20′.

This system utilizes the motor 20 of FIG. 16 and the circuitry connected therewith, but no provision is made for stopping the sewing machine with the needle in any particular position. It may or may not be engaged with the work. In other respects the modified system illustrated in FIG. 20 is of the same character as that described in relation to the first embodiment of the invention, so that it is believed to be unnecessary to go into any detailed description of it. Suffice it to say that in the modified circuitry of FIG. 20, the various devices, such as the transmitter clutch, the chain cutter solenoid, the presser foot solenoid, the turntable motor and the auxiliary work positioner solenoid are controlled and operated in the same manner as described in relation to FIGS. 1–16. In this system, means other than motor 20 may be utilized to bring about a quick stopping of the sewing machine, but the provision of such a motor with its polarity or phase control means described in relation to FIG. 16 has been found well suited for the rather quick stopping of the sewing machine. However, other means for accomplishing this result may be employed for the same general purpose.

While various embodiments of the invention have been disclosed in the foregoing, it should be understood that these are simply illustrative of the novel features of the invention, and other forms of certain aspects of the invention may be utilized within the scope of the claims hereinafter presented.

What is claimed is:

1. Apparatus for automatically performing stitching operations on successive edge portions of work pieces applied to a stationary work supporting surface which comprises: a sewing machine having work advancing and stitch forming means, means for driving said sewing machine, means for engaging and guiding an edge of the work-piece to be stitched as it is advanced by said work advancing means through the stitch forming zone of said machine, said work piece having a plurality of edges to be stitched which are at a sharp angle in relation to each other, means for automatically engaging and turning the work-piece relative to the work supporting surface upon completion of the stitching of one of the edges thereof to substantially aline another edge of the work-piece in the direction of advance of the work, work supporting means providing said stationary work supporting surface along which the work-piece is advanced as it is being stitched, a presser foot adapted to retain a portion of the work-piece against said work supporting means as a line of stitching is being applied thereto, and means for automatically lifting said presser foot from the work-piece and retaining the presser foot out of engagement with the work-piece as the latter is being turned by said turning means into a new angular position in relation to said direction of advance of the work-piece.

2. In apparatus as set forth in claim 1, said work supporting means being narrow and adapted to enable a portion of the work-piece being stitched to overhang a side edge of said means, said work supporting means having curved end edges over which the work-piece overhangs as it is being advanced into, through and beyond the stitch forming zone.

3. In apparatus as set forth in claim 2, a rotatable member positioned below said work supporting surface arranged to carry parts of the overhanging portions of said work-pieces in a plane parallel with said work supporting surface, said rotatable member serving to urge the upstream end of the overhanging portion of said work-piece laterally toward said stitch forming zone and to urge the downstream end of said work-piece as it has passed through said stitch forming zone away from said zone.

4. In apparatus of the character set forth in claim 1, control means for predetermining the number of sharp angular turnings imparted to the work-piece in the course of its being advanced through said stitch forming zone and for then causing the formation of a number of free thread stitches at the trailing end of the work-piece.

5. In apparatus as set forth in claim 1, automatically controlled means for predetermining the extent of turning movement applied to the work-piece by said turning means.

6. In apparatus as set forth in claim 1, a light beam creating source, light responsive means in the path of the light beam created by said source, and means controlled by said light responsive means for determining the extent of the advancing and turning movements imparted to a work piece in the course of stitching of the edges thereof.

7. In apparatus as set forth in claim 6, said means for advancing and turning the work-piece being electrically operated, and a plurality of relays and circuits connected therewith arranged to be energized and de-energized in accordance with the exposure and non-exposure of said light responsive means to said light beam for controlling the operation of said work advancing and work turning means.

8. In apparatus as set forth in claim 4, means for severing the free thread chain in a region closely adjacent to the trailing end of said work-piece as it is being advanced beyond the stitch forming zone.

9. In apparatus as set forth in claim 1, means co-operating with said means for engaging and guiding an edge of the work-piece as it is being advanced for urging the work-piece laterally toward said means for guiding an edge of the work-piece.

10. In apparatus as set forth in claim 9, said cooperating means comprising a spring member adapted to force a portion of said work-piece in a region laterally disposed in relation to the stitch forming devices against the work supporting surface.

11. In apparatus as set forth in claim 10, means intermediate said spring member and said presser foot for retaining the work-piece against said work supporting surface.

12. In apparatus as set forth in claim 11, a rock member carrying said spring member and said intermediate means, and means for lifting said rock member to disengage said spring member and said intermediate means from the work when said work turning means is rendered effective.

13. In apparatus as set forth in claim 5, adjustable means for selectively varying the starting position of said turning means.

14. In apparatus as set forth in claim 1, said turning means comprising a constantly rotating member, and means adapted to engage and turn the work, said last mentioned means comprising an element connected with said turning means adapted to be shifted into and out of driving relation to said constantly rotating means.

15. In apparatus as set forth in claim 14, a solenoid arranged to control the driving relation between said constantly rotating member and said turning means, a light source, and light responsive means in the path of light from said light source adapted to control the operation of said solenoid and to cause turning of said turning means upon exposure of said light responsive means to light from said light source.

16. In apparatus as set forth in claim 15, selectively adjustable means for predetermining the region in which turning movement is imparted to the work piece upon energization of said light responsive means.

17. In apparatus as set forth in claim 1, means for projecting a control medium along a predetermined path, a plurality of means in the path of the control medium so projected and responsive to the receipt of said medium, and connections from said last mentioned means adapted to predetermine the extent of turning movement imparted to each work piece by said means for engaging and turning the work piece upon completion of stitching of an edge thereof.

18. In apparatus as set forth in claim 1, means for automatically stopping the operation of said sewing machine abruptly upon completion of the stitching of certain edges at the work pieces.

19. In apparatus as set forth in claim 18, said means for driving said sewing machine comprising a plurality of electric motors, one of said motors being driven at a relatively high speed when current is supplied thereto and a second of said motors being driven at a much slower speed when current is supplied thereto, said means for automatically stopping the operation of said sewing machine including means for delivering current to said second of said motors in a manner tending to reverse its direction of rotation as a line of stitching is completed along an edge of the work piece.

20. In apparatus as set forth in claim 19, said last recited means including time delay means for selectively varying the timing of the delivery of said reversing current to said second of said motors, and means operated step-by-step during the operation of said apparatus for selecting the particular time delay that is active at a particular stage of the operation of the apparatus.

21. In apparatus as set forth in claim 20, said time delay means and said means operated step-by-step being so constructed and arranged as to maintain the sewing machine in operation upon completion of the stitching of the last of the edges to be stitched long enough to provide a free thread chain beyond said last edge.

22. In apparatus as set forth in claim 19, a photoconductive switch included in said last recited means, a light source, a light reflecting surface arranged for rotation upon the driving of said sewing machine, said light reflecting surface being adapted to direct a beam of light toward said photoconductive switch as the sewing machine is at a predetermined point in its cycle of operation to render said photoconductive switch active and to thereby initiate the stopping action of said second of said motors.

23. In apparatus as set forth in claim 22, said sewing machine having a needle adapted to be carried into and out of engagement with the work, said light reflecting surface being so arranged as to cause stopping of the sewing machine when said needle is engaged with the work.

24. In apparatus as set forth in claim 22, said sewing machine having a needle adapted to be carried into and out of engagement with the work, said light reflecting surface being so arranged as to cause stopping of the sewing machine when said needle is out of engagement with the work.

25. In apparatus as set forth in claim 22, said sewing machine having a plurality of needles adapted to be carried into and out of engagement with the work, said light reflecting surface being so arranged as to cause stopping of the sewing machine when said needles are out of engagement with the work.

26. In apparatus as set forth in claim 25, an auxiliary needle, and electrical means for operating said auxiliary needle to engage the work when the sewing machine is stopped with its needles out of engagement with the work.

27. In apparatus as set forth in claim 26, means for preventing operation of said electrical means when the sewing machine is stopped after completion of the stitching of the last edge of the work piece that is to be stitched.

28. In apparatus for applying lines of stitching to a plurality of edges of work pieces having said edges disposed at abrupt angles in relation to each other, means for advancing work pieces along a stationary work supporting surface, means for directing a control medium toward the edges of said work pieces to be stitched, a plurality of means responsive to said control medium positioned in the path thereof and adapted to receive the same, said means for advancing said work pieces serving to advance the same in a particular direction, means independent of said advancing means for turning said work pieces to a substantial extent on said stationary surface in relation to said particular direction, and means controlled by said means responsive to said control medium upon receipt thereof for controlling the operation of said means for advancing said work pieces and said means for turning said work pieces to present another edge of the work piece being stitched into alinement with the direction of advance of the work piece.

29. In apparatus of the character set forth in claim 28, at least three means responsive to said control medium being provided in the path of the control medium, directed by said means for directing the control medium toward the edges of said work pieces, and electrical circuits energized by said control medium responsive means for controlling the extent of advancement and turning of said work piece.

30. In apparatus of the character set forth in claim 29, certain of said control medium responsive means predetermining the commencement and termination of the stitching operation, and another of said control medium responsive means predetermining the commencement and duration of the turning movement of the work piece.

31. Sewing apparatus for automatically performing stitching operations on successive edge portions of a work piece, comprising a stationary work supporting surface, a sewing machine having work advancing and stitch forming means, means for driving said sewing machine, a presser foot, means cooperating with said work advancing means for guiding an edge of the work piece to be stitched in the course of its movement along said supporting surface in accordance with the shape of said edge, such successive edge portions being disposed at a substantial angle in relation to each other, sensing means adapted to detect the regions in which said successive edge portions are interconnected, electrical circuit means controlled by said sensing means for automatically starting and stopping the operation of the sewing machine, such operation including the lowering and raising of said presser foot, means adapted to automatically engage the work piece and aline a second of said successive edges of the work piece in the direction of advance of the work upon completion of the stitching of the first of said edges, further electrical circuit means for controlling the operation of said edge alining means, said sensing means being adapted to automatically detect when the second of said successive edges is properly alined with the stitch forming means in the direction in which the work is advanced and to then arrest the operation of said edge aligning means.

32. In an apparatus as set forth in claim 31, said means for automatically aligning a second of said successive edges in the direction of advance of the work after completion of the stitching operation on the first of said edges comprising a turning mechanism adapted to engage the work piece and turn it on the work support in a horizontal plane about the point at which said needle last enters the work in stitching the edge which has been completed.

33. In sewing apparatus as set forth in claim 31, adjustable means for predetermining the number of successive edge portions of a work piece to be stitched, said sensing means being adapted to automatically control the starting and stopping of the sewing machine upon completion of the stitching of each of the successive edge portions, said further electrical circuit means for controlling the operation of said edge aligning means being adapted to repeat the alinement of further of said successive edges as the immediately preceding edge portion has been fully stitched, and means for automatically discontinuing the operation of said edge aligning means and said sewing machine when the last of said predetermined successive edge portions has been fully stitched.

References Cited

UNITED STATES PATENTS

| | | |
|---|---|---|
| 2,226,677 | 12/1940 | Vikhman. |
| 2,971,483 | 2/1961 | Cordier. |
| 3,072,081 | 1/1963 | Milligan et al. |
| 3,080,836 | 3/1963 | Clemens et al. ___ 112—203 XR |
| 3,224,393 | 12/1965 | Adams et al. |

JAMES R. BALER, *Primary Examiner.*

U.S. Cl. X.R.

112—102